United States Patent
Stille et al.

(10) Patent No.: US 12,316,687 B2
(45) Date of Patent: May 27, 2025

(54) NODES AND METHODS FOR HANDLING PROVISION OF AN IMS SERVICE IN A COMMUNICATIONS NETWORK

(71) Applicant: Telefonaktiebolaget LM Ericsson (publ), Stockholm (SE)

(72) Inventors: Mats Stille, Bromma (SE); Mattias Dahlqvist, Stockholm (SE); Timo Forsman, Sollentuna (SE); Charles Hegarty, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 287 days.

(21) Appl. No.: 17/797,243

(22) PCT Filed: Feb. 4, 2020

(86) PCT No.: PCT/SE2020/050102
§ 371 (c)(1),
(2) Date: Aug. 3, 2022

(87) PCT Pub. No.: WO2021/158149
PCT Pub. Date: Aug. 12, 2021

(65) Prior Publication Data
US 2023/0046490 A1 Feb. 16, 2023

(51) Int. Cl.
*H04L 65/1069* (2022.01)
*H04L 65/1016* (2022.01)
*H04L 65/1046* (2022.01)

(52) U.S. Cl.
CPC ...... *H04L 65/1069* (2013.01); *H04L 65/1016* (2013.01); *H04L 65/1046* (2013.01)

(58) Field of Classification Search
CPC .............. H04L 65/1069; H04L 65/1016
See application file for complete search history.

(56) References Cited

U.S. PATENT DOCUMENTS

| 2017/0339655 A1 | 11/2017 | Keller et al. |
| 2018/0124124 A1 | 5/2018 | Corona et al. |

(Continued)

FOREIGN PATENT DOCUMENTS

| CN | 109891938 A | 6/2019 |
| CN | 109995721 A | 7/2019 |

(Continued)

OTHER PUBLICATIONS

3GPP TS 23.228 V16.3.0, "3rd Generation Partnership Project; Technical Specification Group Services and System Aspects; IP Multimedia Subsystem (IMS); Stage 2 (Release 16)," Dec. 2019, 349 pages.

(Continued)

*Primary Examiner* — Kristie D Shingles
(74) *Attorney, Agent, or Firm* — Sage Patent Group

(57) ABSTRACT

A method, by a first node, for handling provision of an IMS service. A communications network comprises a first slice handling a first IMS service, and a second slice handling a second IMS service. The first node obtains, from a second node at least one of a first and a second indication. The first indication is of a first routing service instance for a third node handling the first service in the first slice. The second indication is of a second routing service instance for a fourth node handling the second service in the second slice. The first node routes a request, to one of the nodes with one of the proviso that when the request is for the first service, the routing is based on the first indication, and when the request is for the second service, the routing is based on the second indication.

15 Claims, 8 Drawing Sheets

(56) References Cited

U.S. PATENT DOCUMENTS

| | | | |
|---|---|---|---|
| 2019/0182741 A1* | 6/2019 | Oyman | H04W 36/304 |
| 2020/0329075 A1 | 10/2020 | Zhang et al. | |
| 2021/0006549 A1* | 1/2021 | Mufti | H04L 63/08 |
| 2021/0021647 A1* | 1/2021 | Cai | H04L 65/1026 |
| 2021/0176817 A1* | 6/2021 | Takakura | H04L 65/1069 |
| 2021/0226838 A1* | 7/2021 | Hegarty | H04L 65/1069 |
| 2022/0053034 A1* | 2/2022 | Hegarty | H04L 65/1016 |
| 2022/0167244 A1* | 5/2022 | Zaus | H04L 69/24 |

FOREIGN PATENT DOCUMENTS

| | | |
|---|---|---|
| CN | 110324284 A | 10/2019 |
| EP | 2695358 A1 | 2/2014 |
| WO | 2019150245 A1 | 8/2019 |
| WO | 2019179607 A1 | 9/2019 |

OTHER PUBLICATIONS

Office Action for Chinese Patent Application No. 202080089459.7 dated Jun. 24, 2024, 6 pages.

International Search Report and Written Opinion of the International Searching Authority for PCT International Application No. PCT/SE2020/050102 dated Nov. 16, 2020.

3GPP TR 23.794 V17.0.0, "3rd Generation Partnership Project; Technical Specification Group Services and System Aspects; Study on enhanced IP Multimedia Subsystem (IMS) to 5GC integration (Release 17)," Dec. 2019, 83 pages.

Vargic et al., "IMS interworking using IBCF," Third 2008 International Conference on Convergence and Hybrid Information Technology, IEEE 2008, pp. 89-94.

3GPP TS 23.228 V16.2.0, "3rd Generation Partnership Project; Technical Specification Group Services and System Aspects; IP Multimedia Subsystem (IMS); Stage 2 (Release 16)," Sep. 2019, 348 pages.

3GPP TS 23.501 V16.2.0, "3rd Generation Partnership Project; Technical Specification Group Services and System Aspects; System Architecture for the 5G System (5GS); Stage 2 (Release 16)," Sep. 2019, 391 pages.

3GPP TS 24.229 V16.3.0, "3rd Generation Partnership Project; Technical Specification Group Core Network and Terminals; IP multimedia call control protocol based on Session Initiation Protocol (SIP) and Session Description Protocol (SDP); Stage 3 (Release 16)," Sep. 2019, 1060 pages.

GSM Association, "IMS Profile for Voice, Video and Messaging over 5GS," Version 1.0, Official Document NG. 114, Sep. 27, 2019, 71 pages.

* cited by examiner a)

b)

a)

b)

a)

b)

a)

b)

NODES AND METHODS FOR HANDLING PROVISION OF AN IMS SERVICE IN A COMMUNICATIONS NETWORK

CROSS REFERENCE TO RELATED APPLICATION

This application is a 35 U.S.C. § 371 national stage application of PCT International Application No. PCT/SE2020/050102 filed on Feb. 4, 2020, the disclosure and content of which is incorporated by reference herein in its entirety.

TECHNICAL FIELD

The present disclosure relates generally to a first node and methods performed thereby for handling provision of an Internet Protocol Multimedia Subsystem (IMS) service in a communications network. The present disclosure also relates generally to a second node, and methods performed thereby for handling provision of the IMS service in the communications network. The present disclosure further relates generally to a sixth node and methods performed thereby for handling provision of the IMS service in the communications network.

BACKGROUND

Computer systems in a communications network may comprise one or more nodes, which may also be referred to simply as nodes. A node may comprise one or more processors which, together with computer program code may perform different functions and actions, a memory, a receiving and a sending port. A node may be, for example, a server.

The standardization organization 3GPP is currently in the process of specifying a New Radio Interface called New Radio (NR) or 5G-Universal Terrestrial Radio Access (UTRA), as well as a Fifth Generation (5G) Packet Core Network, which may be referred to as Next Generation (NG) Core Network, abbreviated as NG-CN, NGC or 5G CN.

Currently, in the 5G architecture, the concept of network slicing has been introduced, which may be understood as "a set of network functions, and resources to run these network functions, forming a complete instantiated logical network to meet certain network characteristics required by the Service Instance(s)." An instantiated logical network may be understood as a dedicated set of instantiated network resources, software and hardware, that may be understood to form a complete network configuration isolated from other logical network instances, for a set of user terminals authorized to be connected to the logical network instance, that is, a network slice instance.

Network slicing may be understood to primarily comprise the following components: physical resource, logical resource, and network function.

Physical resource may be understood as a physical asset capable of performing computation, storage or transport including radio access. Logical resource may be understood as a partition of a physical resource, or grouping of multiple physical resources dedicated to a Network Function or shared between a set of Network Functions. A Network Function (NF) may be understood to refer to processing functions executing a dedicated task in a network. This may include, but is not limited to, telecommunication nodes functionality, as well as switching functions, e.g., Ethernet switching functions, and Internet Protocol (IP) routing functions.

A Network slice may be defined within a Public Land Mobile Network (PLMN) and may be understood to include a Core Network Control Plane and User Plane Network Functions, and, in the serving PLMN, at least one of the following: the NG Radio Access Network and the N3IWF functions to the non-3GPP Access Network.

In the home network, the PLMN Operator may manage and orchestrate the Network Slicing operations for the 5G subscribers. These slicing operations may include: design, instantiate, operate and decommission Network Slices for the 5G subscribers. The slice selection mechanism may be based on PLMN, Access Point Name (APN), UE Usage type, Single Network Slice Selection Assistance Information (S-NSSAI) etc.

The IP Multimedia Subsystem (IMS) may be understood as an architectural framework for delivering IP multimedia services, that is, IMS services, such as Voice over LTE (VoLTE) and Rich Communication Services (RCS) over a telecommunications network. VoLTE may be understood as a service that supports calls over a 4G LTE network, rather than over 2G or 3G connections which may be usually used. RCS may be understood as a communication protocol between mobile telephone carriers and between phone and carrier, which may provide SMS-type messages with a text-message system that may be understood to be richer, provides phonebook polling, and may transmit in-call multimedia.

Discussions are currently ongoing in 3GPP, see for example, TR 23.794 V1.1.10, on the impacts on the IMS domain in relation to 5GC network slicing, e.g., in the case where the IMS domain may offer different services to different 5GC network slices, see 3GPP 23.228 Annex AA.1.1 Architectural Support.

IMS Voice over LTE (VoLTE) and Rich Communication Services (RCS) services as of Global System for Mobile Communications Association (GSMA) NG.114 are to a large extent supported among mobile network operators (MNO).

Some operators may want their own dual IMS networks to perform different IMS services, e.g., in the case of VoLTE and RCS as IMS services, one for VoLTE, one for RCS. Reasons for separating the networks are many, for example to keep track of Operating Expenses (OPEX) benefits, ability to upgrade, modify, re-configure and regression test, an IMS network function belonging to one IMS slice without risking traffic disturbance in the other.

Hence one and the same subscriber and device, e.g., a smartphone, may be served by dual IMS networks and/or slices.

Currently, however, a technology and/or mechanism does not exist for dispatching terminating IMS service sessions, e.g., VoLTE and RCS, to the right IMS slice, that is, the one of the dual IMS slices that may be handling the service.

SUMMARY

It is an object of embodiments herein to provide a method for handling provision of an Internet IMS service in a communications network.

According to a first aspect of embodiments herein, the object is achieved by a method, performed by a first node. The first node operates in a communications network. The method is for handling provision of an Internet Protocol Multimedia Subsystem (IMS) service in the communications network. The communications network comprises a first slice handling a first IMS service, and a second slice handling a second IMS service. The first node obtains, from a second node operating in the communications network at least one of: a first indication and a second indication. The first indication is of a first routing service instance for a third node comprised in the first slice. The third node handles the first IMS service. The second indication is of a second routing service instance for a fourth node comprised in the second slice. The fourth node handles the second IMS service. The first node also routes a request, received from a fifth node operating in another communications network, to one of the third node and the fourth node. One of the following applies. With the proviso that the received request is for the first IMS service, the routing is based on the obtained first indication. With the proviso that the received request is for the second IMS service, the routing is based on the obtained second indication.

According to a second aspect of embodiments herein, the object is achieved by a method, performed by the second node. The second node operates in the second communications network. The method is for handling provision of an IMS service in the communications network. The communications network comprises the first slice handling the first IMS service, and the second slice handling the second IMS service. The second node provides, to the first node operating in the communications network, at least one of: the first indication and the second indication. The first indication of the first routing service instance for the third node comprised in the first slice. The third node handles the first IMS service. The first indication enables routing of the first request for the first IMS service to the third node. The second indication for the second routing service instance for the fourth node comprised in the second slice. The fourth node handles the second IMS service. The second indication enables routing of the second request for the second IMS service to the fourth node.

According to a third aspect of embodiments herein, the object is achieved by a method, performed by the seventh node. The seventh node operates in the first communications network. The method is for handling provision of an IMS service in the communications network. The seventh node manages a terminating_IMS Call Session Control Function (ICSCF). The communications network comprises a slice handling an IMS service. The seventh node registers with the second node as a provider of an IMS service. The second node manages a Network Repository Function (NRF) in the communications network. The seventh node also provides the IMS service based on the registration.

According to a fourth aspect of embodiments herein, the object is achieved by the first node, configured to operate in the communications network. The first node is configured to provision an IMS service in the communications network. The communications network is configured to comprise a first slice configured to handle a first IMS service, and a second slice configured to handle a second IMS service. The first node is further configured to obtain, from the second node configured to operate in the communications network at least one of: the first indication and the second indication. The first indication is of the first routing service instance for the third node configured to be comprised in the first slice. The third node is configured to handle the first IMS service. The second indication is of the second routing service instance for the fourth node configured to be comprised in the second slice. The fourth node is configured to handle the second IMS service. The first node is also configured to route a request, configured to be received from the fifth node configured to operate in another communications network, to one of the third node and the fourth node. One of the following may apply. With the proviso that the request configured to be received is for the first IMS service, the routing is configured to be based on the first indication configured to be obtained. With the proviso that the request configured to be received is for the second IMS service, the routing is configured to be based on the second indication configured to be obtained.

According to a fifth aspect of embodiments herein, the object is achieved by the second node. The second node is configured to operate in the communications network. The second node is configured to handle provision of an IMS service in the communications network. The communications network is configured to comprise the first slice configured to handle the first IMS service, and the second slice configured to handle the second IMS service. The second node is further configured to provide, to the first node configured to operate in the communications network, at least one of the first indication and the second indication. The first indication is of the first routing service instance the third node configured to be comprised in the first slice. The third node is configured to handle the first IMS service. The first indication is configured to enable routing of a first request for the first IMS service to the third node. The second indication is for the second routing service instance for the fourth node configured to be comprised in the second slice. The fourth node is configured to handle the second IMS service. The second indication is configured to enable routing of the second request for the second IMS service to the fourth node.

According to a sixth aspect of embodiments herein, the object is achieved by the seventh node. The seventh node is configured to operate in the communications network. The seventh node is further configured to handle provision of an IMS service in the communications network. The seventh node is configured to manage a terminating ICSCF. The communications network is configured to comprise the slice handling an IMS service. The seventh node is further configured to register with the second node as a provider of an IMS service. The second node is configured to manage an NRF in the communications network. The seventh node is further configured to provide the IMS service based on the registration.

By the first node obtaining the first indication and/or the second indication, the first node is enabled to identify the appropriate node in the slice handling the IMS service associated with the received request, and then route the received request to the appropriate node in the slice handling the IMS service associated with the received request. This may be performed with a simplified architecture and processing with respect to existing methods, as for example, in a DNS based system, which require instead having to statically configure diameter links among the nodes, which would increase the work effort.

By the seventh node registering with the second node, the second node may be enabled to identify the appropriate node in the slice handling a particular IMS service, and then provide to the first node the first indication and/or the second indication accordingly. In turn, by doing so, the second node thereby enables the first node to later route any incoming requests to the appropriate node in the slice handling the IMS associated with the request the first node may receive.

BRIEF DESCRIPTION OF THE DRAWINGS

Examples of embodiments herein are described in more detail with reference to the accompanying drawings, according to the following description.

DETAILED DESCRIPTION

Figure 1:
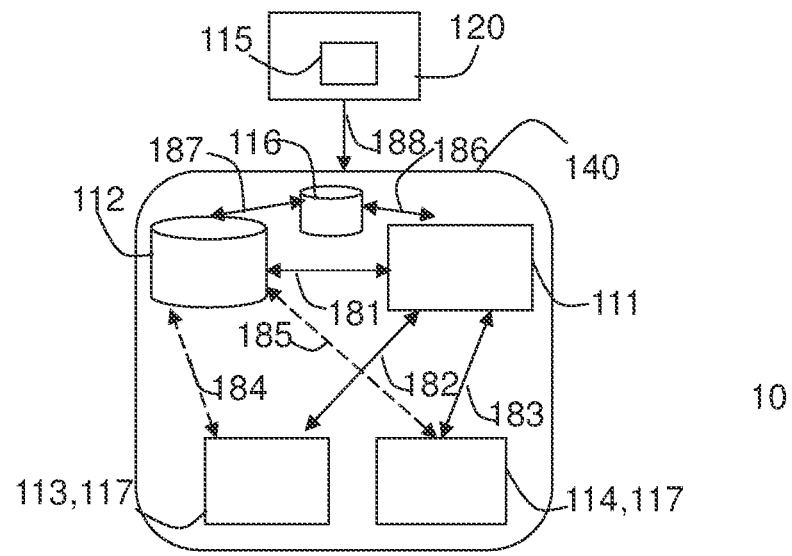
FIG. 1 is a schematic diagram illustrating a non-limiting example of a communications network, according to embodiments herein.
Figure 1:
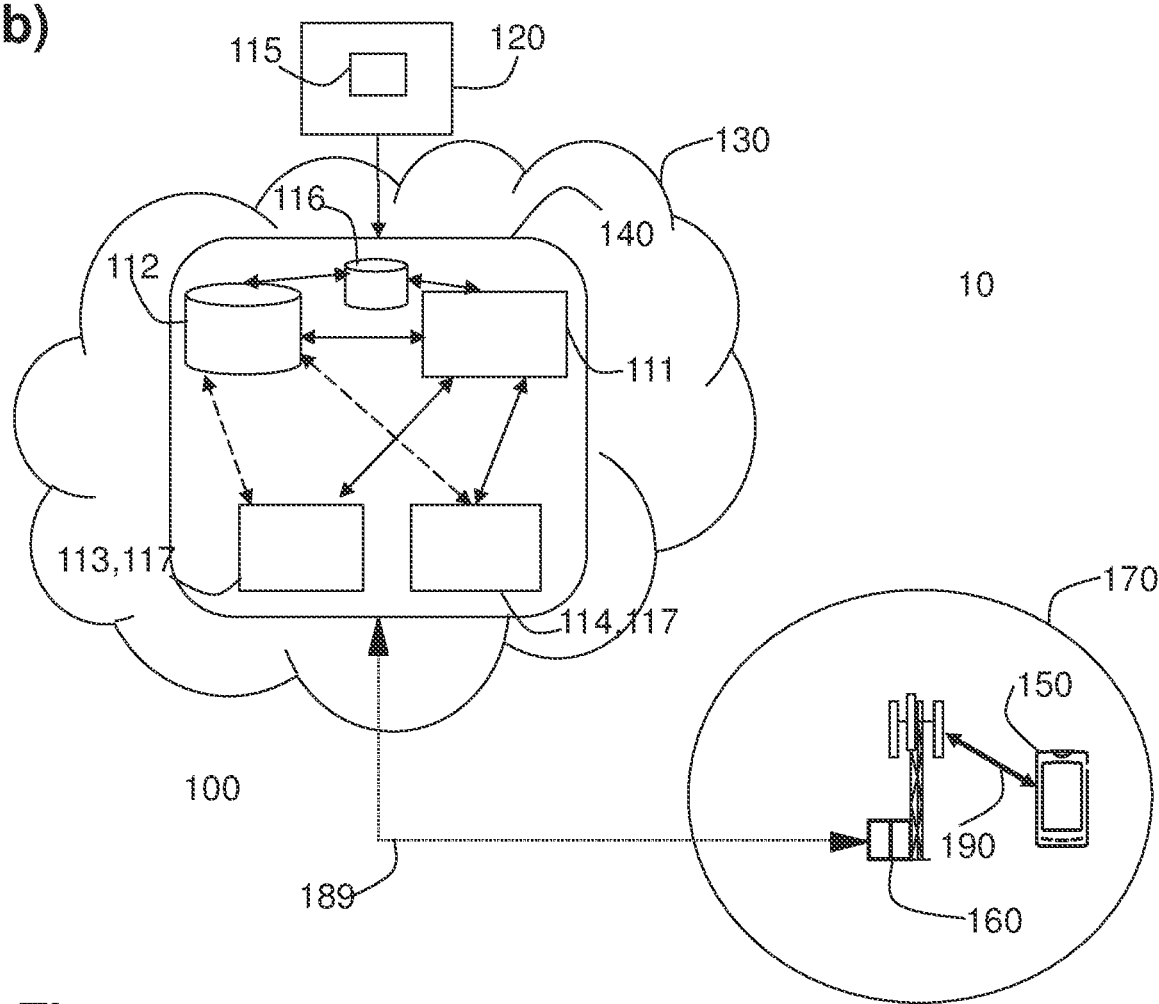

As part of the development of embodiments herein, a problem with exiting methods will first be identified and discussed.

As mentioned earlier in the Background section, in the context of a communications network with a plurality of IMS slices, e.g., with dual IMS slices, there is currently no technology and/or mechanism for terminating IMS service sessions, such as VoLTE and RCS, to the right IMS slice, namely, the one of the IMS slices that may be handling the service.

In the communications network supporting such plurality of IMS slices, there may be nodes that are common to the plurality of slices. At some point, communications coming into the communications network related to a specific IMS service may need to be routed to the appropriate slice supporting that specific IMS service. However, existing methods, such selective routing is not possible.

To illustrate the problem of existing methods in further detail, two particular scenarios in 5G networks according to which the separation and/or slicing of IMS functions may be performed will be described below: Scenario 1 and Scenario 2. Each one of these scenarios gives rise to specific routing problems, as explained next.

Scenario 1

In Scenario 1, the operator is separating and/or slicing all IMS functions, e.g., Session Initiation Protocol-Application Server (SIP-AS), Proxy-Call Session Control Function (P-CSCF), Serving-Call Session Control Function (S-CSCF), IMS-Home Subscriber Server (IMS-HSS), between the dual IMS slices, except for the operator's IMS network ingress and egress point of presence Interconnection Border Control Function (IBCF) entity with foreign IMS networks.

This common IBCF may receive a SIP Request for VoLTE or RCS from a node in a foreign network over a Network to Network Interface (NNI).

When the operator's dual IMS slices has one terminating, Interrogating-Call Session Control Function (I-CSCF) function each, the IBCF may be understood to need to route the SIP request only to one of them, but never to both.

A problem arises then for the common IBCF to know which one of them to select for onwards routing.

Scenario 2

In Scenario 1, the operator is separating and/or slicing all IMS functions between the dual IMS slices except for the aforementioned IMS IBCF entity, but also the IMS-HSS and the terminating_I-CSCF function. That is, in Scenario 2, these three may be understood to be common resources serving the dual IMS slices.

Upon a received SIP Request for VoLTE or RCS over NNI, the common IBCF may route the SIP request to the common terminating_I-CSCF function.

When the operator's dual IMS slices have one Serving-CSCF (S-CSCF) function each, said terminating_I-CSCF may be understood to need to select a S-CSCF instance and route only to that selected S-CSCF, but never both.

A problem arises then for the common terminating_I-CSCF to know which one of the two service-CSCFs to select for routing purposes.

Several embodiments are comprised herein, which address these problems of the existing methods. Embodiments herein may be understood to relate to a terminating routing policy framework in dual IMS core networks and/or slices.

Embodiments herein may solve the problem of existing methods by utilizing the benefits of the currently defined 3GPP Service Based Architecture (SBA) based 5GC core network.

The embodiments will now be described more fully hereinafter with reference to the accompanying drawings, in which examples are shown. In this section, embodiments herein are illustrated by exemplary embodiments. It should be noted that these embodiments are not mutually exclusive. All possible combinations are not described to simplify the description. Components from one embodiment or example may be tacitly assumed to be present in another embodiment or example and it will be obvious to a person skilled in the art how those components may be used in the other exemplary embodiments.

FIG. 1 depicts two non-limiting examples, in panels "a" and "b", respectively, of a communications network 10, in which embodiments herein may be implemented. In some example implementations, such as that depicted in the non-limiting example of FIG. 1a), the communications network 10 may be a computer network. In other example implementations, such as that depicted in the non-limiting example of FIG. 1b), the communications network 10 may be implemented in a telecommunications network 100, sometimes also referred to as a cellular radio system, cellular network or wireless communications system. In some examples, the telecommunications network 100 may comprise network nodes which may serve receiving nodes, such as wireless devices, with serving beams.

In some examples, the telecommunications network 100 may for example be a network such as 5G system, or Next Gen network or an Internet service provider (ISP)-oriented network. The telecommunications network 100 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system.

Although terminology from Long Term Evolution (LTE)/5G has been used in this disclosure to exemplify the embodiments herein, this should not be seen as limiting the scope of the embodiments herein to only the aforementioned system. Other wireless systems, support similar or equivalent functionality may also benefit from exploiting the ideas covered within this disclosure. In future radio access, e.g., in the sixth generation (6G), the terms used herein may need to be reinterpreted in view of possible terminology changes in future radio access technologies.

A plurality of nodes are depicted in FIG. 1, a first node 111, a second node 112, a third node 113, a fourth node 114, a fifth node 115, a sixth node 116, and a seventh node 117. The first node 111, the second node 112, the third node 113, the fourth node 114, the sixth node 116 and the seventh node 117 are comprised in the communications network 10. The fifth node 115 is comprised in another communications network 120. The another communications network 120 may be understood to be enabled to have a similar description to that of the communications network 10.

Each of the first node 111, the second node 112, the third node 113, the fourth node 114, the fifth node 115, the sixth node 116 and the seventh node 117 may be understood, respectively, as a first computer system or server, a second computer system or server, a third computer system or server, a fourth computer system or server, a fifth computer system or server, a sixth computer system or server, and a seventh computer system or server. Any of the first node 111, the second node 112, the third node 113, the fourth node 114, the fifth node 115, the sixth node 116 and the seventh node 117 may be implemented as a standalone server in e.g., a host computer in the cloud 130, as depicted in the non-limiting example of FIG. 1b). In other examples, any of the first node 111, the second node 112, the third node 113, the fourth node 114, the fifth node 115, the sixth node 116 and the seventh node 117 may be a distributed node or distributed server, such as a virtual node in the cloud 130, and may perform some of its respective functions being locally, e.g., by a client manager, and some of its functions in the cloud 130, by e.g., a server manager. In other examples, any of the first node 111, the second node 112, the third node 113, the fourth node 114, the fifth node 115, the sixth node 116 and the seventh node 117 may perform its functions entirely on the cloud 130, or partially, in collaboration or collocated with a radio network node. Yet in other examples, any of the first node 111, the second node 112, the third node 113, the fourth node 114, the fifth node 115, the sixth node 116 and the seventh node 117 may also be implemented as processing resource in a server farm. Any of the first node 111, the second node 112, the third node 113, the fourth node 114, the fifth node 115, the sixth node 116 and the seventh node 117 may be under the ownership or control of a service provider, or may be operated by the service provider or on behalf of the service provider. Typically, first node 111, the second node 112, the third node 113, the fourth node 114, the sixth node 116, and the seventh node 117 may be operated by a same service provider, whereas the fifth node 115 may be operated by another service provider.

Any of the first node 111, the second node 112, the third node 113, the fourth node 114, the sixth node 116, and the seventh node 117 may be a core network node in a core network 140, which may be e.g., a 3GPP SBA based 5GC core network. Any of the first node 111, the second node 112, the third node 113, the fourth node 114, the sixth node 116 and the seventh node 117 may be understood to have a capability to support provision of one or more IMS services.

The first node 111 may be understood to be common to a first slice handling a first IMS service, and a second slice handling a second IMS service, and have a capability to route communications within the communications network 10 to provide an IMS service. In some embodiments, such as those described later for the Scenario 1, the first node 111, may be an IBCF. In other embodiments, such as those described later for the Scenario 2, the first node 111, may be a terminating I-CSCF.

The second node 112 may be understood to be common to the first slice handling the first IMS service, and the second slice handling the second IMS service, and have a capability to provide information regarding IMS services supported in the communications network 10. For example, the second node 112 may be a database, or repository function. In some embodiments, such as those described later for the Scenario 1, the second node 112, may be an NRF. In other embodiments, such as those described later for the Scenario 2, the second node 112, may be an IMS-HSS.

The third node 113 may be understood to be specific to the first slice handling the first IMS service in the communications network 10. In some embodiments, such as those described later for the Scenario 1, the third node 113, may be a first terminating_ICSCF. In other embodiments, such as those described later for the Scenario 2, the third node 113, may be a first S-CSCF.

The fourth node 114 may be understood to be specific to the second slice handling the second IMS service in the communications network 10. In some embodiments, such as those described later for the Scenario 1, the fourth node 114, may be a second terminating_ICSCF. In other embodiments, such as those described later for the Scenario 2, the fourth node 114, may be a second S-CSCF.

The seventh node 117 may be understood to refer to any of the third node 113 and the fourth node 114.

The fifth node 115 may be a node having the capability of sending one or more requests to the communications network 10 for provision of one or more IMS services.

The sixth node 116 may be a node having the capability of storing information regarding IMS services supported in the communications network 10. For example, the sixth node 116 may be a database, or repository function. In some embodiments, such as those described later for the Scenario 2, the sixth node 116, may be an NRF.

In some embodiments, any the first node 111, the second node 112, the third node 113, the fourth node 113, the sixth node 116 and the seventh node 117, may be independent and separated nodes. In other embodiments, any the first node 111, the second node 112, the third node 113, the fourth node 113, the sixth node 116 and the seventh node 117 may be co-located, or be the same node.

It may be understood that any of the communications network 10 and the another communications network 120 may comprise additional nodes. All the possible combinations are not depicted in FIG. 1 to simplify the Figure.

The communications network 10 may comprise a plurality of communication devices, whereof a communication device 150 is depicted in the non-limiting example scenario of FIG. 1. The communications network 10 may also comprise other communication devices. The communication device 150 may be a UE or a Customer Premises Equipment (CPE) which may be understood to be enabled to communicate data, with another entity, such as a server, a laptop, a Machine-to-Machine (M2M) device, device equipped with a wireless interface, or any other radio network unit capable of communicating over a wired or radio link in a communications system such as the communications network 10. The communication device 150 may be also e.g., a mobile terminal, wireless device, wireless terminal and/or mobile station, mobile telephone, cellular telephone, or laptop, just to mention some further examples. The communication device 150 may be, for example, portable, pocket-storable, hand-held, computer-comprised, a sensor, camera, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles or any other radio network unit capable of communicating over a wired or radio link in the communications network 10. The communication device 150 may be enabled to communicate wirelessly in the communications network 10. The communication may be performed e.g., via a RAN and possibly one or more core networks, comprised within the communications network 10.

The communications network 10 may comprise a plurality of radio network nodes, whereof a radio network node 160, e.g., an access node, or radio network node, such as, for example, the radio network node, depicted in FIG. 1b). The telecommunications network 100 may cover a geographical area, which in some embodiments may be divided into cell areas, wherein each cell area may be served by a radio network node, although, one radio network node may serve one or several cells. In the non-limiting example of FIG. 1, the radio network node 160 serves a cell 170. The radio network node 160 may be e.g., a gNodeB. That is, a transmission point such as a radio base station, for example an eNodeB, or a Home Node B, a Home eNode B or any other network node capable to serve a wireless device, such as the communications device 150 in the communications network 10. The radio network node 160 may be of different classes, such as, e.g., macro eNodeB, home eNodeB or pico base station, based on transmission power and thereby also cell size. In some examples, the radio network node may serve receiving nodes with serving beams. The radio network node 160 may support one or several communication technologies, and its name may depend on the technology and terminology used. The radio network node 160 may be directly connected to one or more core networks in the telecommunications network 100.

The first node 111 is configured to communicate within the communications network 10 with the second node 112 over a first link 181. The first node 111 may be configured to communicate with the third node 113 within the communications network 10 over a second link 182. The first node 111 may be configured to communicate with the fourth node 114 within the communications network 10 over a third link 183. The second node 112 may be configured to communicate with the third node 113 within the communications network 10 over a fourth link 184. The second node 112 may be configured to communicate with the fourth node 114 within the communications network 10 over a fifth link 185. The first node 111 may be configured to communicate within the communications network 10 with the sixth node 116 over a sixth link 186. The second node 112 may be configured to communicate within the communications network 10 with the fifth node 115 over an eighth link 188. The core network 130 may be configured to communicate with the radio network node 160 over a ninth link 189. The radio network node 160 may be configured to communicate with the communications device 150 over a tenth link 190. The reference numerals for some of the links are only illustrated in panel a) to simplify FIG. 1.

Any of the links just described may be e.g., a radio link, an infrared link, or a wired link.

Any of the links described may be a direct link or may be comprised of a plurality of individual links, wherein it may go via one or more computer systems or one or more core networks, which are not depicted in FIG. 1, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 1.

In general, the usage of "first", "second", "third", "fourth", "fifth", "sixth", "seventh", "eighth", "ninth" and/or "tenth" herein may be understood to be an arbitrary way to denote different elements or entities, and may be understood to not confer a cumulative or chronological character to the nouns they modify.

Figure 2:
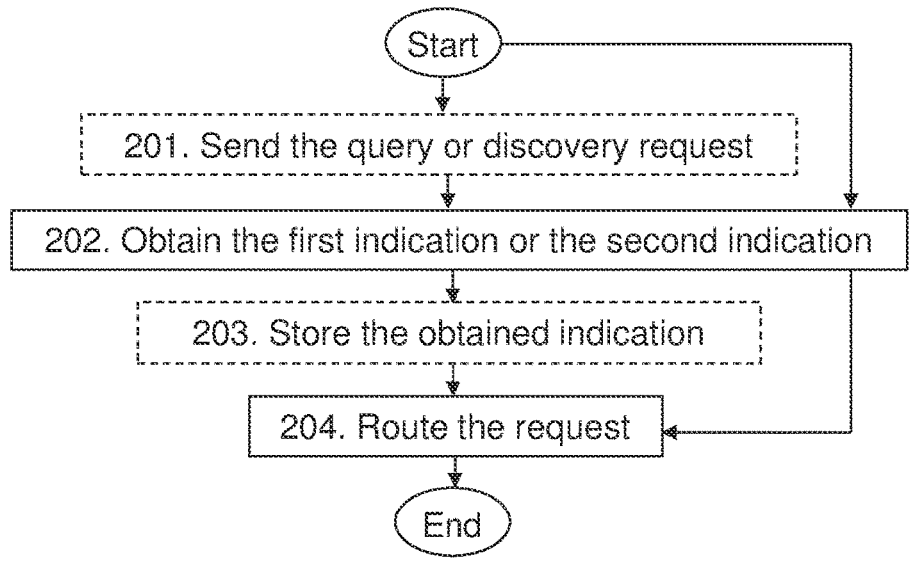
FIG. 2 is a flowchart depicting embodiments of a method in a first node, according to embodiments herein.

Embodiments of method performed by the first node 111, will now be described with reference to the flowchart depicted in FIG. 2. The method may be understood to be for handling provision of an Internet Protocol Multimedia Subsystem (IMS) service in the communications network 10. The first node 111 operates in the communications network 10.

The communications network 10 may be understood to support provision of multiple IMS services, and to handle each of these IMS services with a separate slice. Accordingly, the communications network 10 comprises a first slice handling a first IMS service, and a second slice handling a second IMS service.

In some embodiments, the first IMS service may be Voice Over Long Term Evolution (VoLTE). In some embodiments, the second IMS service may be Rich Communication Services (RCS).

It may be understood that the communications network 10 may support other IMS services, or further IMS services, and that each may be handled by a respective slice.

The method may comprise the actions described below. In some embodiments some of the actions may be performed. In some embodiments all the actions may be performed. In FIG. 2, optional actions are indicated with dashed boxes. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

Action 201

As explained earlier in relation to FIG. 1, the first node 111 may be understood to have a capability to route communications within the communications network 10 to provide or support an IMS service. In the course of operations of the communications network 10, the first node 111 may receive requests for provision of different IMS services. The first node 111 may then need to appropriately route each of the received requests to the slice in the communications network 10 that may have been allocated to handle the particular IMS service associated with the received request.

In order for the first node 111 to eventually route incoming requests to a node within the slice dedicated to the IMS service the received request may be about, in this Action 201, the first node 111 may send 201 a query, or a discovery request, to the second node 112, for at least one of a first indication and a second indication.

The first indication may be of a first routing service instance for the third node 113 comprised in the first slice. The third node 113, as described earlier, may be handling the first IMS service, e.g., VoLTE.

A service instance may be understood as a network function service instance, that is, an identifiable instance of a network function service. A particular, non-limiting description of an NF service instance may be found on 3GPP 23.501 Version 16.3.0, section 3.

A routing service may be understood as a function which may select a path for network traffic towards its destination, e.g., as a NF providing routing service.

Therefore, a routing service instance may be understood as an identifiable instance of the routing NF service.

The second indication may be of a second routing service instance for the fourth node 114 comprised in the second slice. The fourth node 114, as described earlier, may be handling the second IMS service, e.g., RCS.

The query may have been sent after receiving a request for an IMS service from, e.g., the another communications network 120.

In some examples, the received request, e.g., a SIP request, may comprise an identifier (ID) for the IMS service. For example, the identifier may be a service-ID. The service-ID may be in the format of an IMS Communication Service ID (ICSI), see 3GPP 24.229, v, 16.40, section 5.7.1.9.

In some examples of the second group of embodiments, the received request may be the a SIP request e.g. SIP INVITE comprising an IMS service-identifier (ID) for either VoLTE or RCS.

Accordingly, in some examples, the query the first node 111 may send in this Action 201 may also comprise an identifier for one of the first IMS service and the second IMS service, which may be the service identifier that may have been comprised in the received request from the another communications network 120.

In a first group of embodiments, such as those corresponding to Scenario 1, the first node 111 may manage an Interconnection Border Control Function (IBCF), and the second node 112 may manage a Network Repository Function (NRF).

In some embodiments of the first group of embodiments, the third node 113 may be a first terminating_ICSCF.

In some of the first group of embodiments, the fourth node 114 may be a second ICSCF.

In some embodiments, e.g., such as those of the first group of embodiments, the first indication may be a first routing service instance address and the second indication may be a second routing service instance address. Accordingly, in some embodiments, e.g., such as those pertaining to Scenario 1, the discovery request may be for a routing service instance address of a terminating_I-CSCF for a particular IMS, e.g., for a routing service instance address of a terminating_I-CSCF VoLTE and/or for a routing service instance address of an RCS service instance address.

The address may be, e.g., an IP address or a Fully Qualified Domain Name (FQDN).

Accordingly, in some embodiments, e.g., such as those pertaining to Scenario 1, the discovery request may be for a routing service instance address of a terminating_I-CSCF for a particular IMS, e.g., for a routing service instance address of a terminating_I-CSCF VoLTE and/or for a routing service instance address of an RCS service instance address.

In a second group of embodiments, such as those corresponding to Scenario 2, the first node 111 may manage a terminating_I-CSCF, and the second node 112 may manage an IMS-HSS. In some examples, the first node 111, e.g., the terminating_I-CSCF, may have discovered the service of the second node 112, e.g., the IMS-HSS, from an NRF.

In some embodiments of the second group of embodiments, the query that may be sent in this Action 201 may be a location information query.

In some embodiments of the second group of embodiments, the third node 113 may be a first S-CSCF.

In some of the second group of embodiments, the fourth node 114 may be a second S-CSCF.

The sending in this Action 201 may be performed, via the first link 181.

In some embodiments of the second group of embodiments, the sending in this Action 201 may be over one of: a) an SBI N70 interface, and b) a Cx/Diameter protocol operation. For example, if the communications network 10 is not upgraded for SBA interfaces, instead of using the N70 reference point, the first node 111 may use a legacy Cx/Diameter protocol operation 'LIR' towards the second node 112.

By sending the query, or the discovery request, in this Action 201, the first node 111 may be able to obtain the requested indications, and thereby be enabled to then route any incoming requests, e.g., a current session request, to the appropriate node in the slice handling the IMS associated with the received request.

Action 202

In this Action 202, the first node 111, obtains, from the second node 112 operating in the communications network 10 at least one of: a) the first indication of the first routing service instance for the third node 113 comprised in the first slice, the third node 113 handling the first IMS service, and b) the second indication of the second routing service instance for the fourth node 114 comprised in the second slice, the fourth node 114 handling the second IMS service.

In some embodiments wherein Action 201 may have been performed, the obtaining in this Action 202 may be in response to the sent query.

In some embodiments, e.g., those of the second group of embodiments, one of the following alternatives may apply. According to a first alternative, with the proviso that the query that may have been sent in Action 201 may comprise an identifier for one of the first IMS service and the second IMS service, only the one of the first indication and the second indication corresponding to the IMS service identified by the sent identifier may be obtained. According to a second alternative, with the proviso that the query that may have been sent in Action 201 may lack an identifier for one of the first IMS service and the second IMS service, both of the first indication and the second indication may be obtained.

As mentioned earlier the identifier may be a service-ID.

For example, in some of the second group of embodiments, the first node 111 may or may not have included the service identifier which in the query. If not included, the second node 112 may return each serving-CSCF instances of the two dual IMS slices. The first indication and the second indication may then be set to indicate which IMS service, VoLTE or RCS, the third node 113, and the fourth node 114 may be serving, respectively. If included, the second node 112 may return just the indication for the one of the third node 113, and the fourth node 114 associated with the service identifier.

In examples wherein the communications network 10 may use non-SBA interfaces, if the service identifier is not included in request, the first node 111 may obtain each of the first indication and the second indication. Each of the first indication and the second indication may then be set to indicate which IMS service, VoLTE or RCS, the third node 113, and the fourth node 114 may be serving, respectively.

If the service identifier is included in the request, the first node 111 may just obtain the indication for the one of the third node 113, and the fourth node 114 associated with the service identifier.

Obtaining, may comprise receiving, collecting or gathering, e.g., via the first link 181.

By obtaining the first indication and/or the second indication in this Action 202, the first node 111 may be enabled to identify the appropriate node in the slice handling the IMS associated with the received request, and then route any incoming requests, e.g., the current session request, to the appropriate node in the slice handling the IMS associated with the received request.

Action 203

In this Action 203, the first node 111 may store, e.g., in a memory, the obtained at least one of the first indication and the second indication.

Action 204

In this this Action 204, the first node 111, routes a request, received from the fifth node 115 operating in the another communications network 120, to one of the third node 113 and the fourth node 114. One of the following alternatives may apply: With the proviso that the received request is for the first IMS service, the routing in this Action 204 is based on the obtained first indication. With the proviso that the received request is for the second IMS service, the routing 204 is based on the obtained second indication.

In the embodiments wherein Action 203 may have been performed, the routing in this Action 204 may be based on the stored first indication and the second indication.

For example, in some embodiments of the first group of embodiments, wherein the first node 111 may be an IBCF, the received request may be a terminating VoLTE SIP request or a terminating RCS request from a foreign network such as the second communications network 120. Upon reception of the request, the first node 111 may then, in this Action 204, route the SIP request, to the first terminating_I-CSCF instance, or the second terminating_I-CSCF instance discovered in Action 202, pertaining to the SIM service associated with the received request.

In other examples, in some of the embodiments of the second group of embodiments, wherein the first node 111 may be a terminating_I-CSCF, the received request may be the SIP request, e.g., the SIP INVITE comprising the IMS service-identifier (ID) for either VoLTE or RCS described earlier. The SIP request may have been initially received by an IBCF in the communications network 10, and then onward routed to the first node 111.

In this Action 204, the first node 111 may onward route the received SIP request to the serving-CSCF instance, e.g., serving VoLTE or RCS, that may have been indicated by the second node 112 in Action 202.

By routing the request based on the first indication or the second indication in this Action 204, the first node 111 may be enabled to route the incoming requests, e.g., the current session request, to the appropriate node in the slice handling the IMS associated with the received request. This may be performed with a simplified architecture and processing with respect to existing methods, as for example, in a DNS based system, which require instead having to statically configure links among the nodes, which would increase the work effort.

For example, implementing the embodiments herein in the IBCF, as may be done in the embodiments of the first group of embodiments, such as those of Scenario 1, may be understood to ensure that a single ingress point may be offered to foreign networks and/or IPXs thus reducing OPEX cost for the interworking partners.

Figure 3:
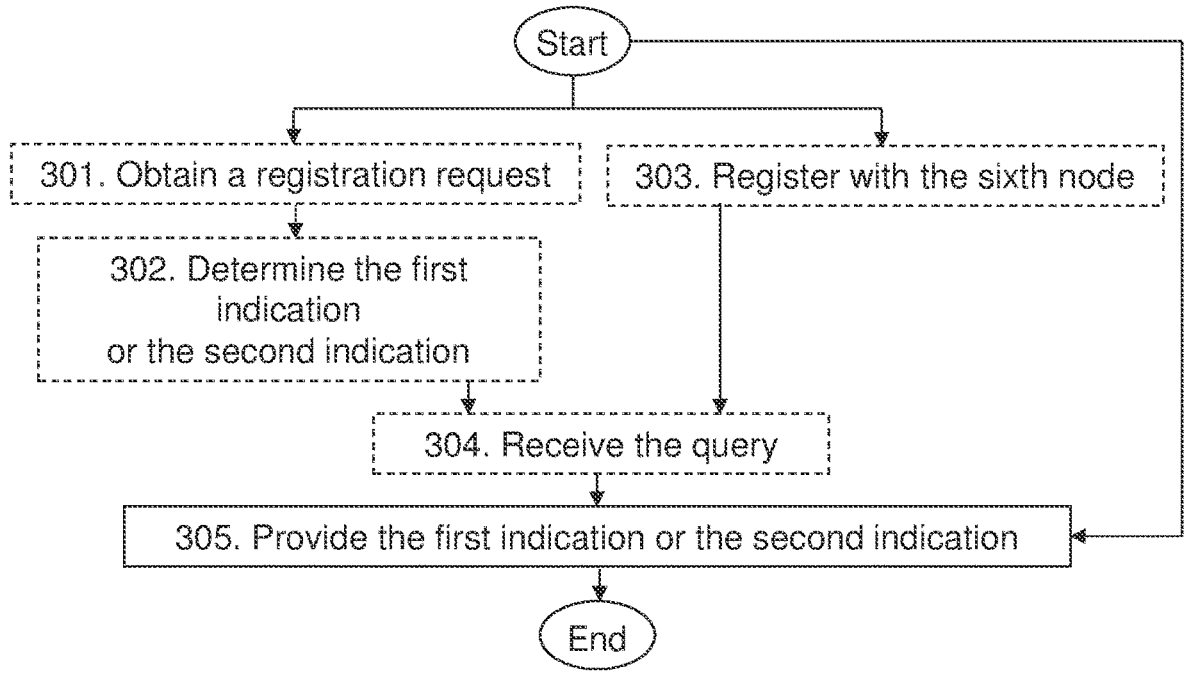
FIG. 3 is a flowchart depicting embodiments of a method in a second node, according to embodiments herein.

Embodiments of a method performed by the second node 112, will now be described with reference to the flowchart depicted in FIG. 3. The second node 112 operates in the communications network 10. The method is being for handling provision of an IMS service in the communications network 10.

As stated earlier, the communications network 10 may be understood to support provision of multiple IMS services, and to handle each of these IMS services with a separate slice. Accordingly, the communications network 10 comprises the first slice handling the first IMS service, and the second slice handling the second IMS service.

It may be understood that the communications network 10 may support other IMS services, or further IMS services, and that each may be handled by a respective slice.

The method comprises the following actions. Several embodiments are comprised herein. In FIG. 3, optional actions are indicated with dashed boxes. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first node 111, and will thus not be repeated here to simplify the description. For example, in some embodiments, the first IMS service may be VoLTE. In some embodiments, the second IMS service may be RCS.

Action 301

In some embodiments, e.g., some embodiments of the first group of embodiments, the second node 112, may, in this Action 301, obtain at least one of: a first registration request and a second registration request. The first registration request may be from the third node 113 as a provider of the first IMS service. The second registration request may be from the fourth node 114 as a provider of the second IMS service.

The obtaining in this Action 301 may be implemented, e.g., via the fourth link 184, for the first registration request, and via the fifth link 185, for the second registration request.

By obtaining the first registration request and/or the second registration request, the second node 112 may be enabled to identify the appropriate node in the slice handling a particular IMS service, and then provide to the first node 111 the first indication and/or the second indication. In turn, by doing so, the second node 112 may thereby enable the first node 111 to later route any incoming requests to the appropriate node in the slice handling the IMS associated with the request the first node 111 may receive Action 302

In this Action 302, the second node 112 may determine at least one of the first indication and the second indication. This determination may be based, respectively, on the obtained first registration request and the obtained second registration request in Action 301.

Determining may be understood as calculating, predicting, estimating, or similar.

In some embodiments of the first group of embodiments, the first node 111 may manage an IBCF, and the second node 112 may manage an NRF.

In the first group of embodiments, such as those corresponding to Scenario 1, the third node 113 may be a first terminating_ICSCF.

In some of the first group of embodiments, the fourth node 114 may be a second ICSCF.

In some embodiments of the first group of embodiments, the first indication may be a first routing service instance address and the second indication may be a second routing service instance address.

In some embodiments of the second group of embodiments, the first node 111 may manage a terminating_I-CSCF, and the second node 112 may manage an IMS-HSS.

In the second group of embodiments, such as those corresponding to Scenario 2, the third node 113 may be a first S-CSCF.

In some of the second group of embodiments, the fourth node 114 may be a second S-CSCF.

By determining the first indication and/or the second indication, the second node 112 may then be able to provide at least one of these indications to the first node 111, and thereby enable the first node 111 to later route any incoming requests to the appropriate node in the slice handling the IMS associated with the request the first node 111 may receive Action 303

In some embodiments, e.g., some embodiments of the second group of embodiments, the second node 112 may, in this Action 303, register with the sixth node 116 operating in the communications network 10. The second node 112 may be an IMS-HSS. The sixth node 116 may be, for example an NRF.

By registering with the sixth node 116, the second node 112 may then enable the first node 111 to discover it via the sixth node 116, and thereby also enable the first node 111 to query, or send the discovery request to, the second node 112 for the first indication and/or the second indication Action 304

In some embodiments, the second node 112 may, in this Action 304, receive the query or the discovery request from the first node 111, for at least one of the first indication and the second indication.

As stated earlier, in some examples, the query may comprise an identifier (ID) for the IMS service. For example, the identifier may be a service-ID. The service-ID may be in the format of an ICSI.

In some embodiments, e.g., some embodiments of the second group of embodiments, the query may be for the location of at least one of the third node 113 and the fourth node 114. The query may be received based on the registration performed in Action 303.

The receiving in this Action 304 may be performed, via the first link 181.

In some embodiments of the second group of embodiments, the receiving in this Action 304 may be over one of: a) the SBI N70 interface, and b) the Cx/Diameter protocol operation.

Action 305

The second node 112, in this Action 305, provides, to the first node 111 operating in the communications network 10, the at least one of the first indication and the second indication. As described earlier, the first indication is of the first routing service instance for the third node 113 comprised in the first slice. The third node 113 handles the first IMS service. The first indication enables routing of the first request for the first IMS service to the third node 113. The second indication is for the second routing service instance for the fourth node 114 comprised in the second slice. The fourth node 114 handles the second IMS service. The second indication enables routing of the second request for the second IMS service to the fourth node 114.

Providing, may comprise sending, e.g., via the first link 181.

In embodiments wherein Action 304 may have been performed, the providing in this Action 305 may be performed in response to the received query.

In some embodiments, such as those of the second group of embodiments, one of the following alternatives may apply. According to a first alternative, with the proviso that the query that may have been received in Action 304 may comprise an identifier for one of the first IMS service and the second IMS service, only the one of the first indication and the second indication corresponding to the IMS service identified by the sent identifier may be provided. According to a second alternative, with the proviso that the query that may have been received in Action 304 may lack an identifier for one of the first IMS service and the second IMS service, both of the first indication and the second indication may be provided.

As mentioned earlier, the identifier may be a service-ID.

In embodiments wherein Action 301 may have been performed, the provided first indication may be based on the first registration request.

Similarly, the provided second indication may be based on the second registration request.

Figure 4:
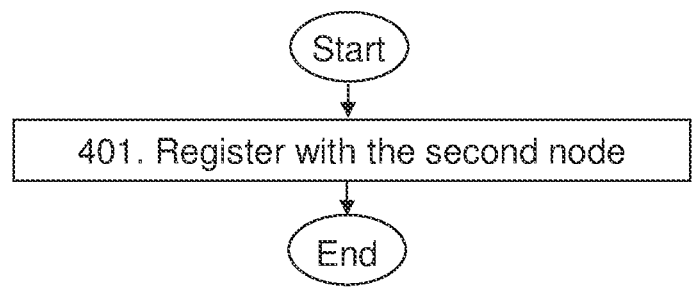
FIG. 4 is a flowchart depicting embodiments of a method in a sixth node, according to embodiments herein.

Embodiments of a method performed by the seventh node 117, will now be described with reference to the flowchart depicted in FIG. 4. The method is for handling provision of an IMS service in the communications network 10. The seventh node 117 operates in the communications network 10. The seventh node 117 manages a terminating_ICSCF. The communications network 10 comprises at least a slice handling an IMS service.

The method comprises the following actions. Several embodiments are comprised herein. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first node 111, and will thus not be repeated here to simplify the description. For example, it may be understood that the communications network 10 may support other IMS services, or further IMS services, and that each may be handled by a respective slice. Accordingly, the communications network 10 may comprise the first slice handling the first IMS service, and the second slice handling the second IMS service. In some embodiments, the first IMS service may be Voice Over Long Term Evolution (VoLTE). In some embodiments, the second IMS service may be Rich Communication Services (RCS). The communications network 10 may comprise one of the third node 113 and the fourth node 114, different from the seventh node 117. The other or the third node 113 and the fourth node 114 that may be additionally comprised in the communications network 10 may handle another IMS service not handled by the seventh 117.

Action 401

In this Action 401, the seventh node 117 registers with the second node 112 as a provider of an IMS service. The second node 112 manages an NRF in the communications network 10.

As indicated earlier, the seventh node 117 may be the third node 113, which may be handling the first IMS service, e.g., VoLTE. In other example, the seventh node 117 may be the fourth node 114, which may be handling the second IMS service, e.g., RCS.

In agreement with this, the registering in this Action 401 may comprise one of the following alternatives. In a first alternative, the registering may comprise sending the first registration request from the seventh node 117 as a provider of the first IMS service, the first IMS service being, e.g., VoLTE. In a second alternative, the registering may comprise, sending the second registration request from the seventh node 117 as a provider of the second IMS service, the second IMS service being, e.g., RCS.

Accordingly, in this Action 401, an I-CSCF service instance of a VoLTE IMS slice may register its terminating routing service for VoLTE to the NRF. In other examples, another I-CSCF service instance, of the RCS IMS slice, may register its RCS terminating routing service for RCS to the NRF.

Action 402

In this Action 402, the seventh node 117 provides, that is, supports the provision of, the IMS service based on the registration. If the seventh node 117 registered for VoLTE, it may support provision of VoLTE, and it registered for RCS, it may support provision of RCS.

The methods just described as being implemented by the first node 111, the second node 112 and the seventh node 117 will now be described in further detail with specific non-limiting examples in the next four figures, based on the already mentioned Scenario 1 and Scenario 2.

Figure 5:
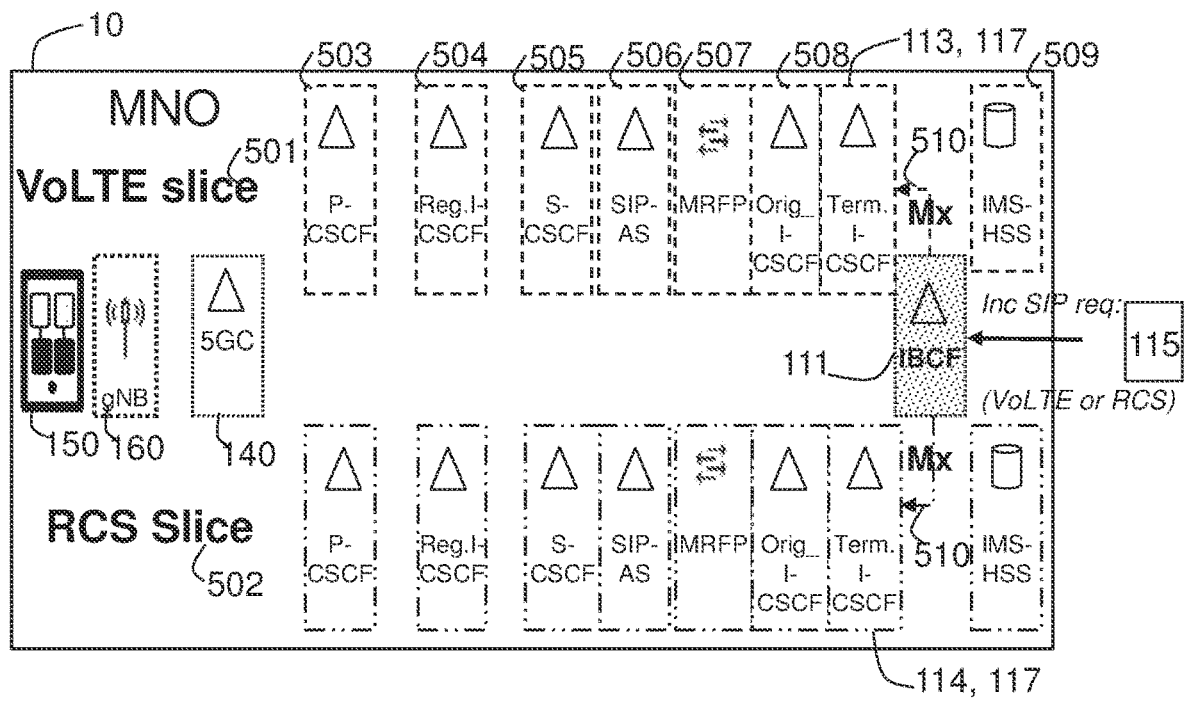
FIG. 5 is a schematic diagram depicting a first non-limiting example of an architecture in a communications network, according to embodiments herein.

FIG. 5 is a schematic block diagram depicting a non-limiting example of an architecture the communications network 10 may have in the first group of embodiments herein, in accordance with Scenario 1. In this non-limiting example, the communications network 10 comprises the communications device 150, a radio access network represented by the radio network node 160, and the core network 140. The communications network 10 is owned by an operator having dual IMS networks and comprises the first slice 501 handling VoLTE, depicted as the "VoLTE slice", and the second slice 502 handling RCS, depicted as the "RCS slice". Each of the first slice and the second slice comprises either the third node 113 or the fourth node 114 as a Terminal I-CSCF "Term. I-CSCF", and a respective P-CSCF 503, the I-CSCF a user may have registered its RCS/VoLTE service in, represented as "Reg. I-CSCF" 504, S-CSCF 505, SIP-AS 506, a Multimedia Resource Function Processor (MRFP) 507, an Originating I-CSCF, represented as "Orig._I-CSCF" 508, and IMS-HSS 509. The fifth node 115, e.g., in the another communications network 120, sends a SIP request for either VoLTE or RCS to the first node 111, here an IBCF, which may then need to route the received request to one of the third node 113 and the fourth node 114, based on the IMS service the received request is for. The routing is performed here through the appropriate Mx interface 510. An example of how this may be performed is provided in the next Figure.

Figure 6:
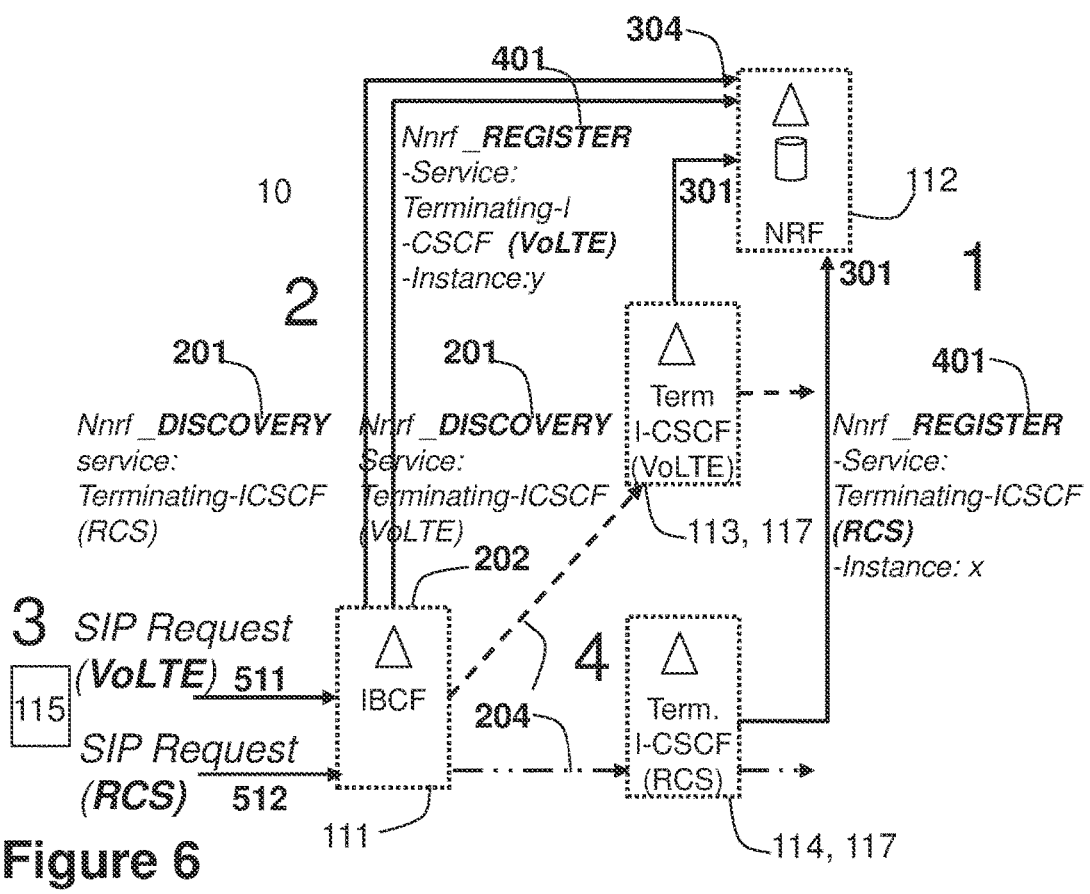
FIG. 6 is a schematic diagram depicting a non-limiting example of signalling between nodes in a communications network having the architecture of the first non-limiting example, according to embodiments herein.

FIG. 6 is a signalling diagram depicting a non-limiting example of how embodiments herein may be implemented in the architecture depicted in FIG. 5, that is, corresponding to Scenario 1. First, at "1", the third node 113, an I-CSCF service instance of a VoLTE IMS slice, may register, in accordance with Action 401, its terminating routing service for VoLTE to the second node 112, an NRF. This may be implemented by sending the first registration request, which may be in the form of "Nnrf_REGISTER-Service:Terminating-I-CSCF (VoLTE)-Instanc:y". Similarly, the fourth node 114, another I-CSCF service instance, of the RCS IMS slice, may register, in accordance with Action 401, its RCS terminating routing service for RCS to the second node 112. This may be implemented by sending the sending registration request, which may be in the form of "Nnrf_REGISTER-Service:Terminating-ICSCF(RCS)-Instance: x". The second node 112 receives the first registration request and the second registration request, respectively, according to Action 301. Second, at "2", the first node 111, the IBCF, may at start-up, put a discovery request, in accordance with Action 201, to the second node 112, the NRF, for a terminating_I-CSCF VoLTE routing service instance address. The query may be in the form of "Nnrf_DISCOVERYService:Terminating-ICSCF(VoLTE)" or "Nnrf_DISCOVERYservice:Terminating-ICSCF(RCS)". The second node 112 receives the query in agreement with Action 304. The IBCF may store, in accordance with Action 203, the terminating_I-CSCF (VoLTE) instance address returned by NRF for later routing usage. The same IBCF may put another discovery request, also in accordance with Action 201, to NRF for a terminating I-CSCF RCS service instance address. The IBCF would store, in accordance with Action 203, the terminating_I-CSCF (RCS) instance address returned by NR for later routing usage. Third, at "3", after this, upon reception of a terminating VoLTE SIP request at 511 from the fifth node 115 in a foreign network such as the another communications network 120, the IBCF would route, in accordance with Action 204, the SIP request, to the terminating_I-CSCF instance discovered in Action 202. Fourth, at "4", upon reception of a terminating RCS request at 512 from the fifth node 115 in a foreign network such as the another communications network 120, the IBCF would do onward routing, in accordance with Action 204, of the SIP request, to the terminating_I-CSCF instance discovered in Action 202.

Figure 7:
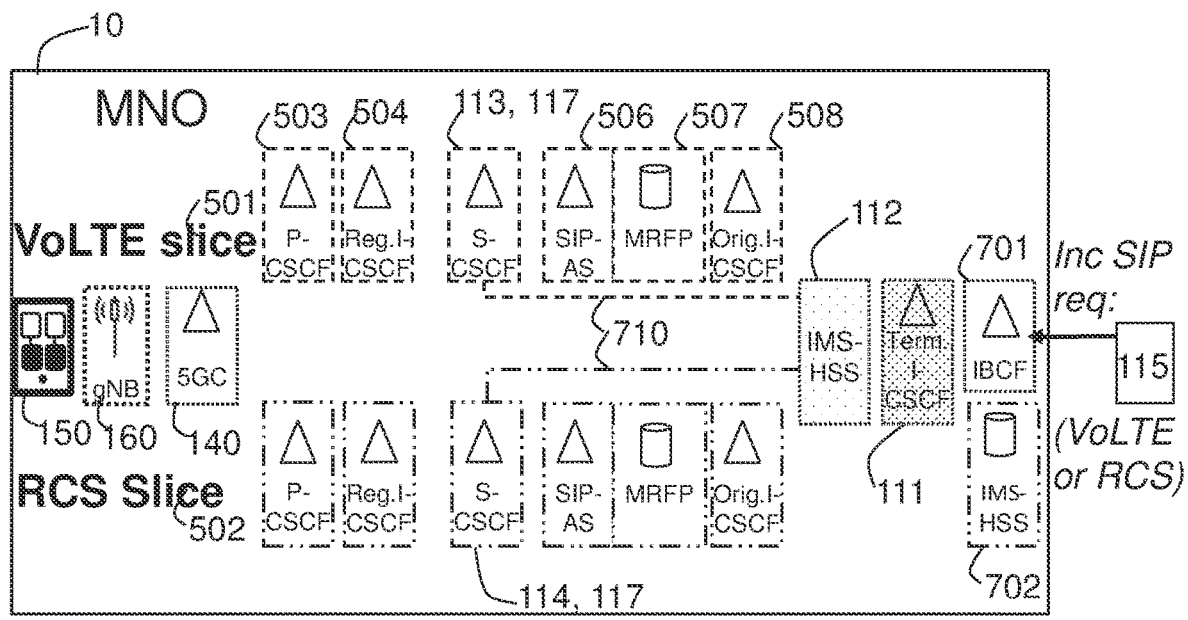
FIG. 7 is a schematic diagram depicting another non-limiting example of an architecture in a communications network, according to embodiments herein.

FIG. 7 is a schematic block diagram depicting a non-limiting example of an architecture the communications network 10 may have in the second group of embodiments herein, in accordance with Scenario 2. In this non-limiting example, the communications network 10 comprises the communications device 150, a radio access network represented by the radio network node 160, and the core network 140. The communications network 10 is owned by an operator having dual IMS networks and comprises the first slice 501 handling VoLTE, depicted as the "VoLTE slice", and the second slice 502 handling RCS, depicted as the "RCS slice". Each of the first slice and the second slice comprises either the third node 113 or the fourth node 114 as S-CSCF, and a respective P-CSCF 503, Reg. I-CSCF 504, SIP-AS 506, MRFP 507, and Orig._I-CSCF 508. In addition, the communications network 10 comprises the first node 111 as a Terminal I-CSCF "Term. I-CSCF", the second node 112 as a first IMS-HSS, an IBCF 701 and a second IMS-HSS 702. The fifth node 115, e.g., in the another communications network 120, sends a SIP request for either VoLTE or RCS to the IBCF 701. The IBCF 701 sends it forward to the first node 111, which may then need to route the received request to one of the third node 113 and the fourth node 114, based on the IMS service the received request is for. The routing is performed here through the appropriate interface 710. An example of how this may be performed is provided in the next Figure.

Figure 8:
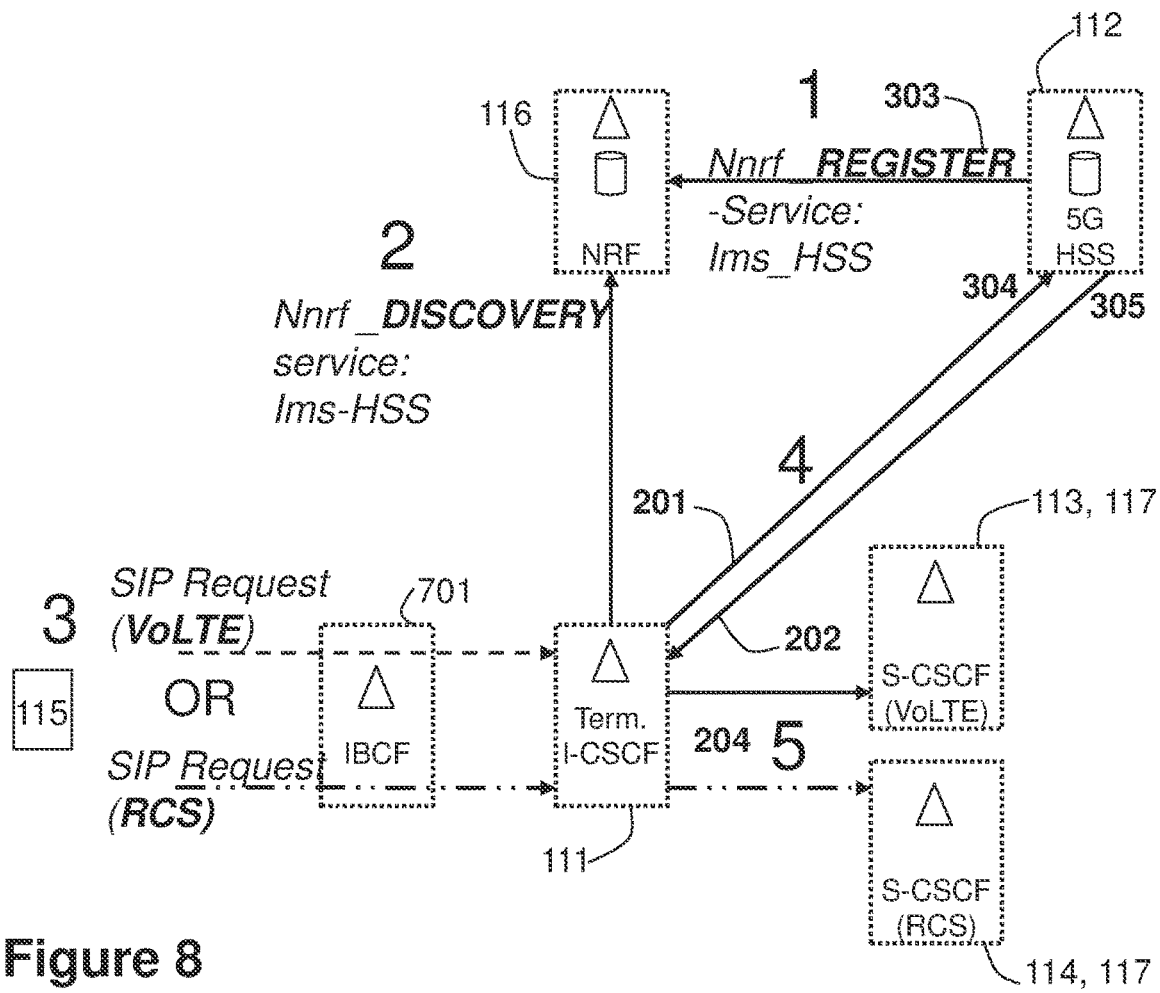
FIG. 8 is a schematic diagram depicting a non-limiting example of signalling between nodes in a communications network having the architecture of the second non-limiting example, according to embodiments herein.

FIG. 8 is a signalling diagram depicting a non-limiting example of how embodiments herein may be implemented in the architecture depicted in FIG. 7, that is, corresponding to Scenario 2. First, at "1", the second node 112, a 5G IMS-HSS registers, in accordance with Action 303, its service to the sixth node 116, here an NRF. Second, at "2", the first node 111, here a Terminating_I-CSCF, discovers the IMS-HSS service from the NRF. Third, at "3", a SIP request e.g., SIP INVITE containing an IMS service-ID for either VoLTE or RCS, is received in the IBCF 701, which makes onward routing of it to the terminating_I-CSCF. Fourth, at "4", the terminating_I-CSCF makes a location information query, in accordance with Action 201, to the IMS-HSS discovered as of step 2, over the SBI N70 interface, see 3GPP 23.228 Annex AA.1.1 Architectural Support. The second node 112 receives the query in accordance with Action 304. The I-CSCF may or may not include the newly introduced service-ID which may be in the format of an ICSI, see 3GPP 24.229 V 16.40, section 5.1.7.9", in the query. If not included, the IMS-HSS may return each serving-CSCF instances of the two dual IMS slices. An indication of the first indication and the second indication may need to be set to indicate which IMS service, VoLTE or RCS, the serving-CSCF is serving. If included, the IMS-HSS may return, in accordance with Action 305, just the serving-CSCF instance associated with the service-ID. Fifth, at "5", the terminating_I-CSCF does onward routing, in accordance with Action 204, of the SIP request to the serving-CSCF instance, serving VoLTE or RCS, obtained, in accordance with, from IMS-HSS in step 4.

It may be noted that if the IMS system of the communications network 10 is not upgraded for SBA interfaces, some steps above may be different as follows. Instead of steps 1 and 2, the legacy IMS method may apply for terminating_I-CSCF to find the IMS-HSS. Instead of using the N70 reference point, the terminating_I-CSCF may use the legacy Cx/Diameter protocol operation 'LIR' towards IMS-HSS to get the serving-CSCF instance.

In case of using non-SBA interfaces, the following may apply. If the service-ID is not included in the LIR, the IMS-HSS may return a response message to LIR, each serving-CSCF instances of the two dual IMS slices. An indication of the first indication and the second indication may need to be set to indicate which IMS service, VoLTE or RCS, the serving-CSCF is serving. If Service-ID is included in the LIR, the IMS-HSS may return just the serving-CSCF instance associated with the service-ID.

As a simplified overview of the foregoing for Scenario 1, according to some examples of embodiments herein, an IBCF instance may be able to query an 5GC Network Function Repository Function (NRF) entity for discovery of the terminating_I-CSCF instance serving VoLTE and RCS respectively. To enable this discovery, a terminating_I-CSCF instance may be able to register itself to a 5GC NRF.

As a simplified overview of the foregoing for Scenario 2, according to some examples of embodiments herein, a common IMS-HSS in a dual IMS sliced system, may, upon a location query from a terminating_I-CSCF function, be able to return two serving-CSCF instances. Moreover, the IMS-HSS may indicate which of them is serving VoLTE and which of them is serving RCS.

The terminating_I-CSCF function may then select the one that serves the received SIP requested service.

It may be noted that an alternative method may be that the location query contains the IMS service ID (ICSI). This may be considered as an order for the IMS-HSS to return only one S-CSCF instance—the one associated with that service ID.

One advantage of embodiments herein may be understood to be that there are OPEX gains for an operator by using 3GPP SBA interfaces when configuring a dual IMS core sliced network, as otherwise a lot of static configurations of diameter links between IMS functions would increase the work effort.

Another advantage of using a 5GC SBA based architecture with the embodiments disclosed herein, is that it allows automatic discovery of an IMS service consumer, e.g. IBCF in Scenario 1 of IMS service producers, and/or terminating_I-CSCF in Scenario 2, instead of having to statically configure diameter links as in a DNS based system.

Implementing the embodiments disclosed herein in the IBCF, as disclosed for example in Scenario 1, ensures that a single ingress point may be offered to foreign networks and/or IPXs thus reducing OPEX cost for the interworking partners.

Figure 9:
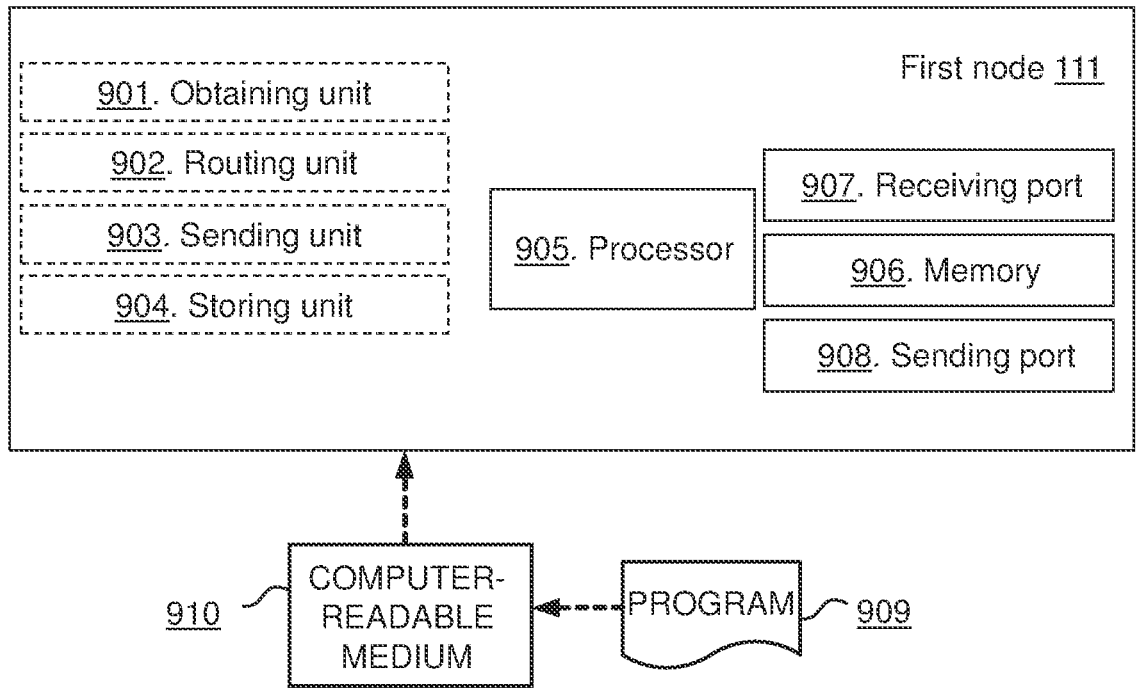
FIG. 9 is a schematic block diagram illustrating two non-limiting examples, a) and b), of a first node, according to embodiments herein.
Figure 9:
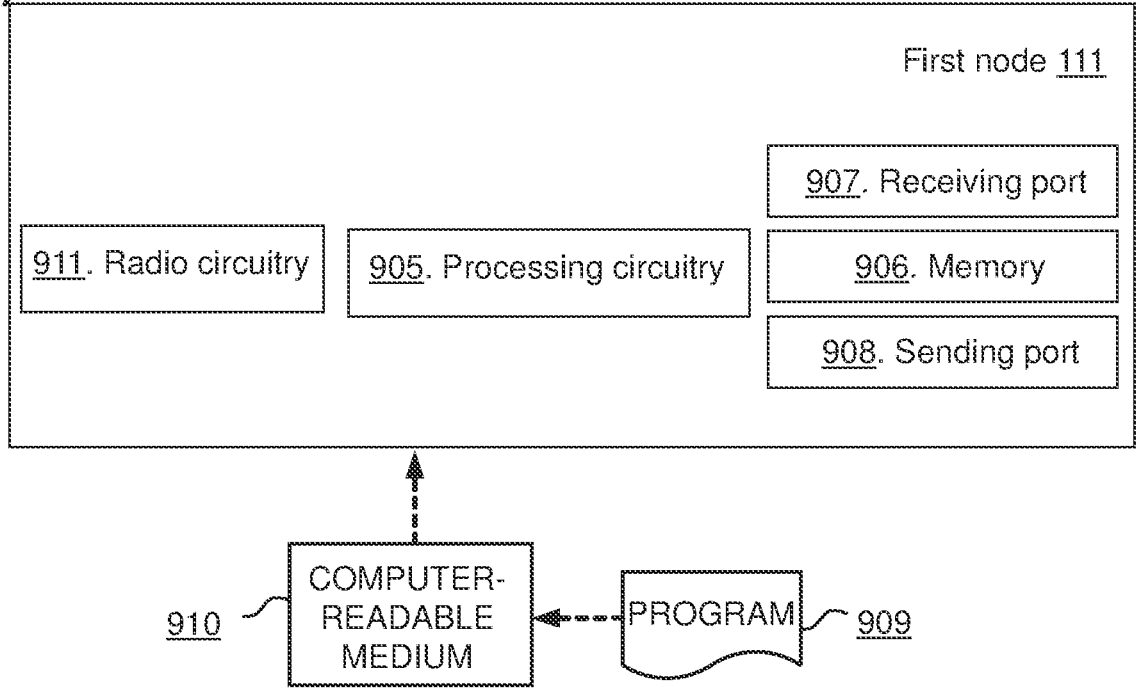

FIG. 9 depicts two different examples in panels a) and b), respectively, of the arrangement that the first node 111 may comprise to perform the method actions described above in relation to FIG. 2. In some embodiments, the first node 111 may comprise the following arrangement depicted in FIG. 9a. The first node 111 is configured to operate in the first communications network 10. The first node 111 is configured to handle provision IMS service in the communications network 10. The communications network 10 is configured to comprise the first slice configured to handle the first IMS service, and the second slice configured to handle the second IMS service.

Several embodiments are comprised herein. Components from one embodiment may be tacitly assumed to be present in another embodiment and it will be obvious to a person skilled in the art how those components may be used in the other exemplary embodiments. In FIG. 9, optional boxes are indicated by dashed lines. The detailed description of some of the following corresponds to the same references provided above, in relation to the actions described for the first node 111, and will thus not be repeated here. For example, in some embodiments, the first IMS service may be configured to be VoLTE. In some embodiments, the second IMS service may be configured to be RCS.

The first node 111 is configured to, e.g. by means of an obtaining unit 901 within the first node 111 configured to, obtain, from the second node 112 configured to operate in the communications network 10 at least one of the first indication and the second indication. The first indication is configured to be of the first routing service instance for the third node 113 configured to be comprised in the first slice.

The third node 113 is configured to handle the first IMS service. The second indication is configured to be of the second routing service instance for the fourth node 114 configured to be comprised in the second slice. The fourth node 114 is configured to handle the second IMS service.

The first node 111 is also configured to, e.g. by means of a routing unit 902 within the first node 111 configured to, route a request, configured to be received from the fifth node 115 configured to operate in the another communications network 120, to one of the third node 113 and the fourth node 114. One of the following may apply. With the proviso that the request configured to be received is for the first IMS service, the routing is configured to be based on the first indication configured to be obtained. With the proviso that the request configured to be received is for the second IMS service, the routing is configured to be based on the second indication configured to be obtained.

In some embodiments, the first node 111 may be configured to, e.g. by means of a sending unit 903 within the first node 111 configured to, send the query or the discovery request to the second node 112, for at least one of the first indication and the second indication. To obtain may be configured to be in response to the query configured to be sent.

In some embodiments, such as those of the first group of embodiments, at least one of: a) the third node 113 may be configured to be a first terminating_ICSCF, and b) the fourth node 114 may be configured to be a second terminating_ICSCF.

In some of such embodiments, the first indication may be configured to be the first routing service instance address and the second indication may be configured to be the second routing service instance address.

In some embodiments, such as those of the first group of embodiments, the first node 111 may be configured to manage the IBCF, and the second node 112 may be configured to manage the NRF.

In some embodiments, such as those of the second group of embodiments, at least one of: a) the third node 113 may be configured to be the first S-CSCF, and b) the fourth node 114 may be configured to be a second S-CSCF.

In some embodiments, such as those of the second group of embodiments, one of the following may apply: a) with the proviso that the query configured to be sent may comprise an identifier for one of the first IMS service and the second IMS service, only the one of the first indication and the second indication corresponding to the IMS service identified by the sent identifier may be configured to be obtained, and b) with the proviso that the query configured to be sent may lack an identifier for one of the first IMS service and the second IMS service, both of the first indication and the second indication may be configured to be obtained.

In some embodiments, to send is configured to be over one of: a) the SBI N70 interface, and b) the Cx/Diameter protocol operation.

In some embodiments, such as those of the second group of embodiments, the first node 111 may be configured to manage a terminating_I-CSCF, and the second node 112 may be configured to manage an IMS-HSS.

In some embodiments, the first node 111 may be further configured to, e.g. by means of a storing unit 904 within the first node 111 configured to, store the at least one of the first indication and the second indication configured to be obtained. In such embodiments, to route may be configured to be based on the first indication and the second indication configured to be stored.

The embodiments herein may be implemented through one or more processors, such as a processor 905 in the first node 111 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 906 comprising one or more memory units. The memory 906 is arranged to be used to store obtained information, store data, configurations, schedulings, and applications etc. to perform the methods herein when being executed in the first node 111.

In some embodiments, the first node 111 may receive information from, e.g., the second node 112, the third node 113, the fourth node 114, the fifth node 115, the sixth node 116, and/or the seventh node 117 through a receiving port 907. In some examples, the receiving port 907 may be, for example, connected to one or more antennas in first node 111. In other embodiments, the first node 111 may receive information from another structure in the system of communications networks 100 through the receiving port 907. Since the receiving port 907 may be in communication with the processor 905, the receiving port 907 may then send the received information to the processor 905. The receiving port 907 may also be configured to receive other information.

The processor 905 in the first node 111 may be further configured to transmit or send information to e.g., the second node 112, the third node 113, the fourth node 114, the fifth node 115, the sixth node 116, and/or the seventh node 117, through a sending port 908, which may be in communication with the processor 905, and the memory 906.

Those skilled in the art will also appreciate that the obtaining unit 901, the routing unit 902, the sending unit 903, and the storing unit 904 described above may refer to a combination of analog and digital circuits, and/or one or more processors configured with software and/or firmware, e.g., stored in memory, that, when executed by the one or more processors such as the processor 905, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the obtaining unit 901, the routing unit 902, the sending unit 903, and the storing unit 904 described above may be the processor 905 of the first node 111, or an application running on such processor.

Thus, the methods according to the embodiments described herein for the first node 111 may be respectively implemented by means of a computer program 909 product, comprising instructions, i.e., software code portions, which, when executed on at least one processor 905, cause the at least one processor 905 to carry out the actions described herein, as performed by the first node 111. The computer program 909 product may be stored on a computer-readable storage medium 910. The computer-readable storage medium 910, having stored thereon the computer program 909, may comprise instructions which, when executed on at least one processor 905, cause the at least one processor 905 to carry out the actions described herein, as performed by the first node 111. In some embodiments, the computer-readable storage medium 910 may be a non-transitory computer-readable storage medium, such as a CD ROM disc, a memory stick, or stored in the cloud space. In other embodiments, the computer program 909 product may be stored on a carrier containing the computer program, wherein the carrier is one of an electronic signal, optical signal, radio signal, or the computer-readable storage medium 910, as described above.

The first node 111 may comprise an interface unit to facilitate communications between the first node 111 and other nodes or devices, e.g., the second node 112, the third node 113, the fourth node 114, the fifth node 115, the sixth node 116, and/or the seventh node 117. In some particular examples, the interface may, for example, include a transceiver configured to transmit and receive radio signals over an air interface in accordance with a suitable standard.

In other embodiments, the first node 111 may comprise the following arrangement depicted in FIG. 9b. The first node 111 may comprise a processing circuitry 905, e.g., one or more processors such as the processor 905, in the first node 111 and the memory 906. The first node 111 may also comprise a radio circuitry 911, which may comprise e.g., the receiving port 907 and the sending port 908. The processing circuitry 905 may be configured to, or operable to, perform the method actions according to FIG. 2, in a similar manner as that described in relation to FIG. 9a. The radio circuitry 911 may be configured to set up and maintain at least a wireless connection with the second node 112, the third node 113, the fourth node 114, the fifth node 115, the sixth node 116, and/or the seventh node 117. Circuitry may be understood herein as a hardware component.

Hence, embodiments herein also relate to the first node 111 operative to handle provision of an IMS service in the communications network 10, the first node 111 being operative to operate in the communications network 10 wherein the communications network 10 comprises the first slice handling the first IMS service, and the second slice handling the second IMS service. The first node 111 may comprise the processing circuitry 905 and the memory 906, said memory 906 containing instructions executable by said processing circuitry 905, whereby the first node 111 is further operative to perform the actions described herein in relation to the first node 111, e.g., in FIG. 2.

Figure 10:
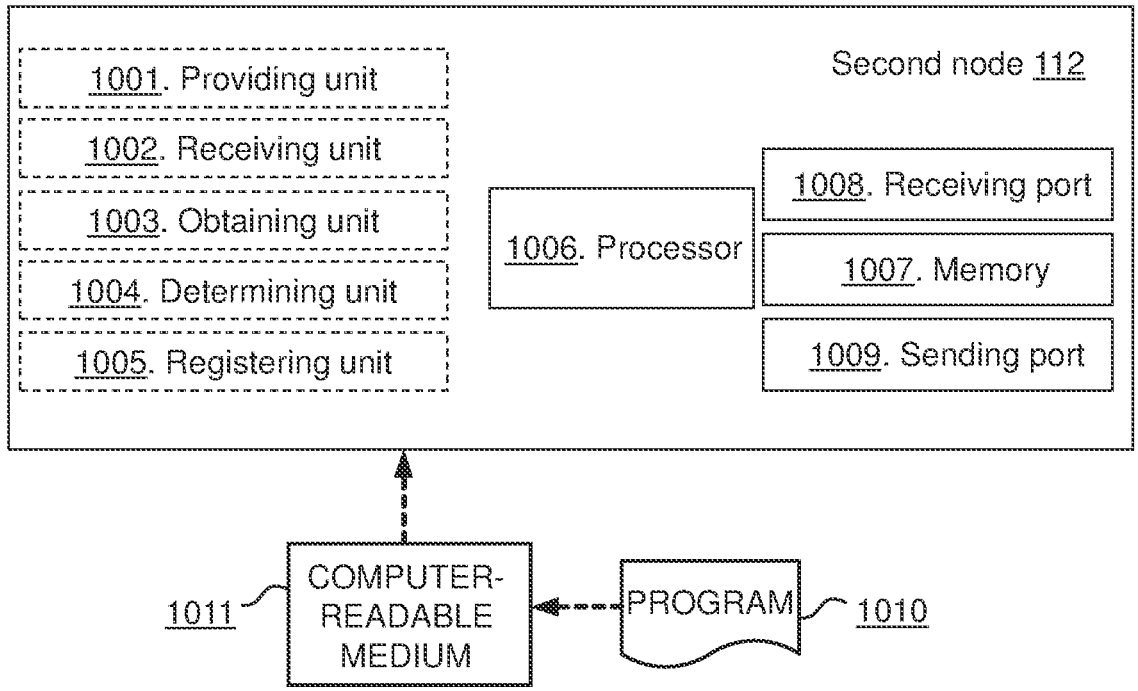
FIG. 10 is a schematic block diagram illustrating two non-limiting examples, a) and b), of a second node, according to embodiments herein.
Figure 10:
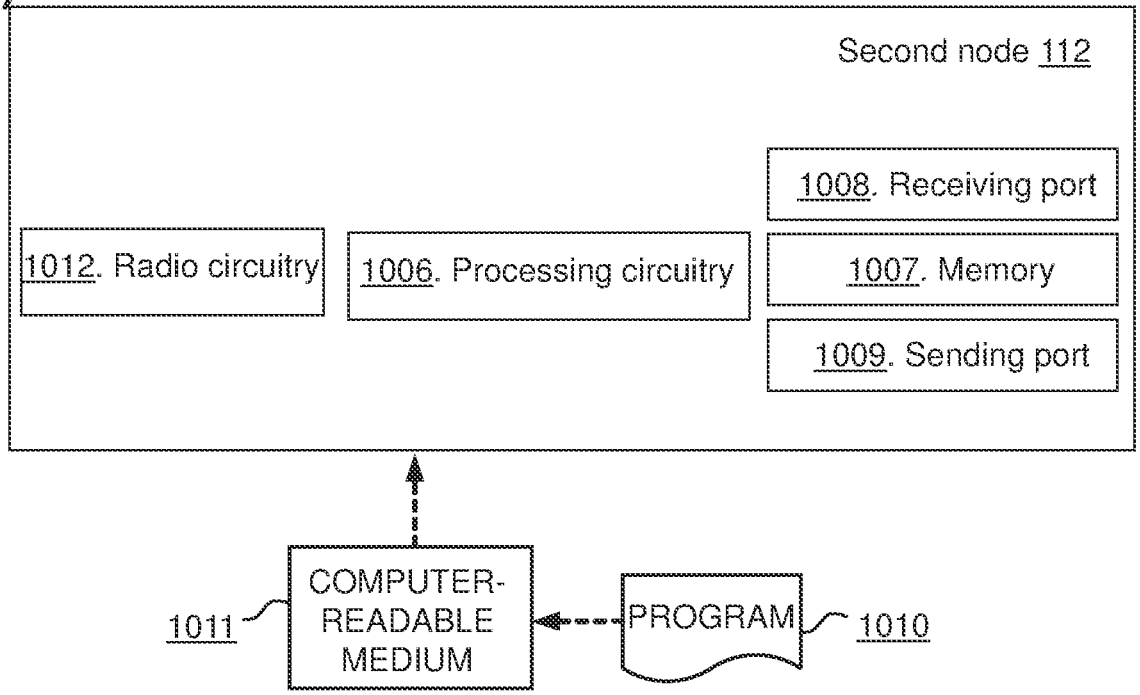

FIG. 10 depicts two different examples in panels a) and b), respectively, of the arrangement that the second node 112 may comprise to perform the method actions described above in relation to FIG. 3. In some embodiments, the second node 112 may comprise the following arrangement depicted in FIG. 10a. The second node 112 is configured to operate in the first communications network 10. The second node 112 is configured to handle provision IMS service in the communications network 10. The communications network 10 is configured to comprise the first slice configured to handle the first IMS service, and the second slice configured to handle the second IMS service.

Several embodiments are comprised herein. Components from one embodiment may be tacitly assumed to be present in another embodiment and it will be obvious to a person skilled in the art how those components may be used in the other exemplary embodiments. In FIG. 10, optional boxes are indicated by dashed lines. The detailed description of some of the following corresponds to the same references provided above, in relation to the actions described for the second node 112, and will thus not be repeated here. For example, in some embodiments, the first IMS service may be configured to be VoLTE. In some embodiments, the second IMS service may be configured to be RCS.

The second node 112 is configured to, e.g. by means of a providing unit 1001 within the second node 112 configured to, provide, to the first node 111 configured to operate in the communications network 10, at least one of: the first indication and the second indication. The first indication is configured to be of the first routing service instance for the third node 113 configured to be comprised in the first slice. The third node 113 is configured to handle the first IMS service. The first indication is configured to enable routing of the first request for the first IMS service to the third node 113. The second indication is configured to be of the second routing service instance for the fourth node 114 configured to be comprised in the second slice. The fourth node 114 is configured to handle the second IMS service. The second indication is configured to enable routing of a second request for the second IMS service to the fourth node 114.

The second node 112, in some embodiments, may also be configured to, e.g. by means of a receiving unit 1002 within the second node 112 configured to, receive the query or the discovery request from the first node 111, for at least one of the first indication and the second indication. In some of such embodiments, to provide may be in response to the query configured to be received.

In some embodiments, the second node 112 may be configured to, e.g. by means of an obtaining unit 1003 within the second node 112 configured to, obtain at least one of: a) the first registration request from the third node 113 as a provider of the first IMS service, wherein the first indication configured to be obtained may be configured to be based on the first registration request, and b) the second registration request from the fourth node 114 as a provider of the second IMS service, wherein the second indication configured to be provided may be configured to be based on the second registration request.

In some embodiments, the second node 112 may be configured to, e.g. by means of a determining unit 1004 within the second node 112 configured to, determine at least one of the first indication and the second indication, based, respectively, on the first registration request configured to be obtained and the second registration request configured to be obtained.

In some embodiments, such as those of the first group of embodiments, at least one of the following may apply: a) the third node 113 may be configured to be a first terminating_ICSCF, and b) the fourth node 114 may be configured to be a second terminating_ICSCF.

In some embodiments, the first indication may be configured to be the first routing service instance address and the second indication may be configured to be the second first routing service instance address.

In some embodiments, such as those of the first group of embodiments, the first node 111 may be configured to manage an IBCF, and the second node 112 may be configured to manage an NRF.

In some embodiments, such as those of the second group of embodiments, at least one of the following may apply: a) the third node 113 may be configured to be a first serving ICSF, and b) the fourth node 114 may be configured to be a second ICSF.

In some embodiments, the second node 112 may be configured to, e.g. by means of a registering unit 1005 within the second node 112 configured to, register with the sixth node 116 configured to operate in the communications network 10. In some of such embodiments, the query may be configured to be for the location of at least one of the third node 113 and the fourth node 114. The query may be configured to be received based on the registration.

In some embodiments, at least one of the following may apply: a) with the proviso that the query configured to be received may be configured to comprise the identifier for one of the first IMS service and the second IMS service, only the one of the first indication and the second indication corresponding to the IMS service identified by the received identifier may be configured to be provided, and b) with the proviso that the query configured to be received may lack the identifier for one of the first IMS service and the second IMS service, both of the first indication and the second indication may be configured to be provided.

In some embodiments, to receive may be configured to be over one of: a) the SBI N70 interface, and b) the Cx/Diameter protocol operation.

The first node 111 may be configured to manage a terminating_I-CSCF, and second node 112 may be configured to manage an IMS-HSS.

The embodiments herein may be implemented through one or more processors, such as a processor 1006 in the second node 112 depicted in FIG. 10, together with computer program code for performing the functions and actions of the embodiments herein. The program code mentioned above may also be provided as a computer program product, for instance in the form of a data carrier carrying computer program code for performing the embodiments herein when being loaded into the in the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 1007 comprising one or more memory units. The memory 1007 is arranged to be used to store obtained information, store data, configurations, schedulings, and applications etc. to perform the methods herein when being executed in the second node 112.

In some embodiments, the second node 112 may receive information from, e.g., the first node 111, the third node 113, the fourth node 114, the fifth node 115, the sixth node 116, and/or the seventh node 117, through a receiving port 1008. In some examples, the receiving port 1008 may be, for example, connected to one or more antennas in second node 112. In other embodiments, the second node 112 may receive information from another structure in the system of communications networks 100 through the receiving port 1008. Since the receiving port 1008 may be in communication with the processor 1006, the receiving port 1008 may then send the received information to the processor 1006. The receiving port 1008 may also be configured to receive other information.

The processor 1006 in the second node 112 may be further configured to transmit or send information to e.g., the first node 111, the third node 113, the fourth node 114, the fifth node 115, the sixth node 116, and/or the seventh node 117, through a sending port 1009, which may be in communication with the processor 1006, and the memory 1007.

Those skilled in the art will also appreciate that the providing unit 1001, the receiving unit 1002, the obtaining unit 1003, the determining unit 1004 and/or the registering unit 1005 described above may refer to a combination of analog and digital circuits, and/or one or more processors configured with software and/or firmware, e.g., stored in memory, that, when executed by the one or more processors such as the processor 1006, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the providing unit 1001, the receiving unit 1002, the obtaining unit 1003, the determining unit 1004 and/or the registering unit 1005 described above may be the processor 1006 of the second node 112, or an application running on such processor.

Thus, the methods according to the embodiments described herein for the second node 112 may be respectively implemented by means of a computer program 1010 product, comprising instructions, i.e., software code portions, which, when executed on at least one processor 1006, cause the at least one processor 1006 to carry out the actions described herein, as performed by the second node 112. The computer program 1010 product may be stored on a computer-readable storage medium 1011. The computer-readable storage medium 1011, having stored thereon the computer program 1010, may comprise instructions which, when executed on at least one processor 1006, cause the at least one processor 1006 to carry out the actions described herein, as performed by the second node 112. In some embodiments, the computer-readable storage medium 1011 may be a non-transitory computer-readable storage medium, such as a CD ROM disc, a memory stick, or stored in the cloud space. In other embodiments, the computer program 1010 product may be stored on a carrier containing the computer program, wherein the carrier is one of an electronic signal, optical signal, radio signal, or the computer-readable storage medium 1011, as described above.

The second node 112 may comprise an interface unit to facilitate communications between the second node 112 and other nodes or devices, e.g., the first node 111, the third node 113, the fourth node 114, the fifth node 115, the sixth node 116, and/or the seventh node 117. In some particular examples, the interface may, for example, include a transceiver configured to transmit and receive radio signals over an air interface in accordance with a suitable standard.

In other embodiments, the second node 112 may comprise the following arrangement depicted in FIG. 10*b*. The second node 112 may comprise a processing circuitry 1006, e.g., one or more processors such as the processor 1006, in the second node 112 and the memory 1007. The second node 112 may also comprise a radio circuitry 1012, which may comprise e.g., the receiving port 1008 and the sending port 1009. The processing circuitry 1006 may be configured to, or operable to, perform the method actions according to FIG. 3, in a similar manner as that described in relation to FIG. 10*a*. The radio circuitry 1012 may be configured to set up and maintain at least a wireless connection with the first node 111, the third node 113, the fourth node 114, the fifth node 115, the sixth node 116, and/or the seventh node 117. Circuitry may be understood herein as a hardware component.

Hence, embodiments herein also relate to the second node 112 operative to handle provision of an IMS service in the communications network 10, the second node 112 being operative to operate in the communications network 10. The communications network 10 is configured to comprise the first slice configured to handle the first IMS service, and the second slice configured to handle the second IMS service. The second node 112 may comprise the processing circuitry 1006 and the memory 1007, said memory 1007 containing instructions executable by said processing circuitry 1006, whereby the second node 112 is further operative to perform the actions described herein in relation to the second node 112, e.g., in FIG. 3.

Figure 11:
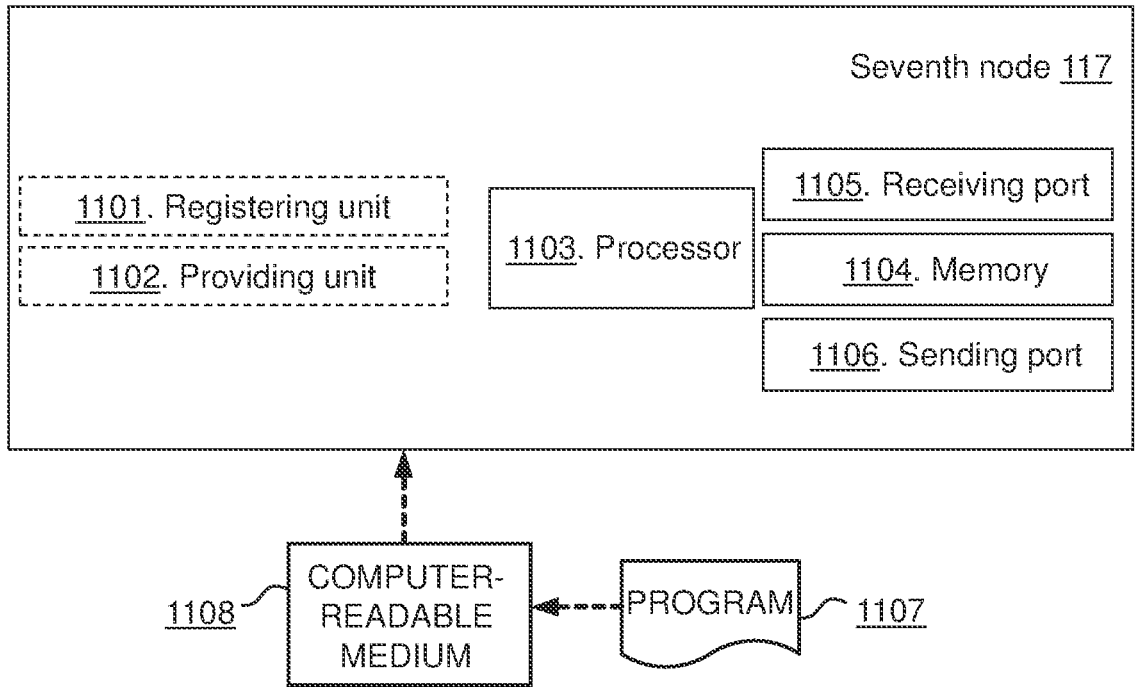
FIG. 11 is a schematic block diagram illustrating two non-limiting examples, a) and b), of a sixth node, according to embodiments herein.
Figure 11:
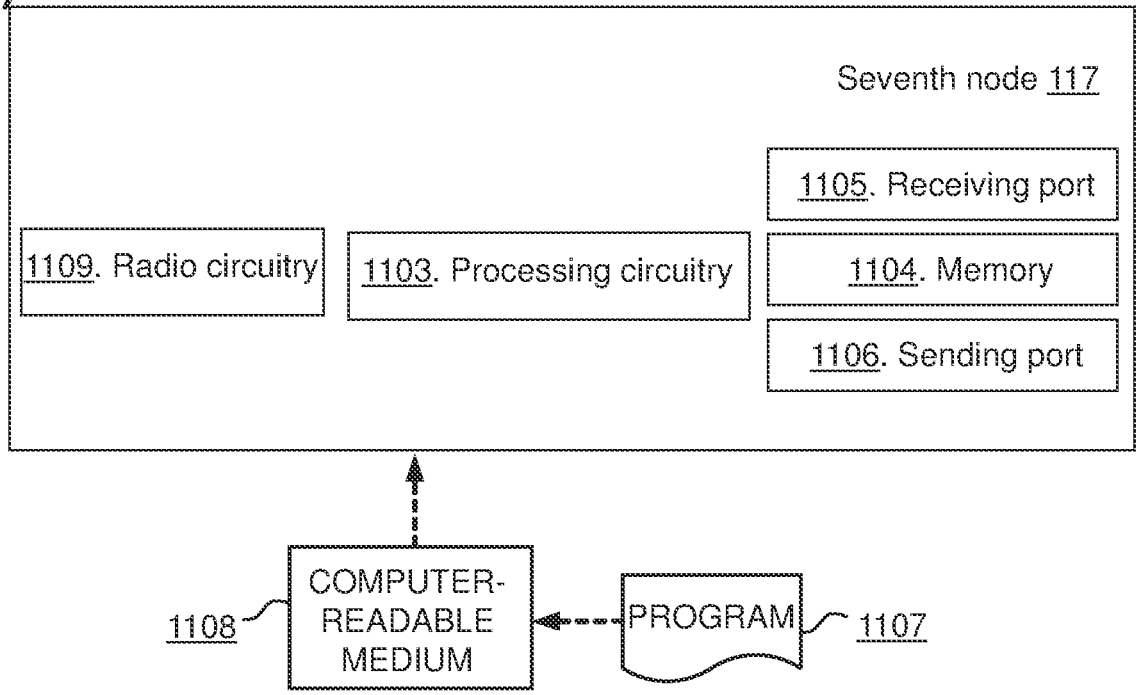

FIG. 11 depicts two different examples in panels a) and b), respectively, of the arrangement that the seventh node 117, 113, 114 may comprise to perform the method actions described above in relation to FIG. 4. In some embodiments, the seventh node 117, 113, 114 may comprise the following arrangement depicted in FIG. 11a. The seventh node 117, 113, 114 is configured to operate in the communications network 10. The seventh node 117, 113, 114 is configured to handle provision of an IMS service in the communications network 10. The seventh node 117, 113, 114 is configured to manage a terminating_ICSCF, wherein the communications network 10 is configured to comprise the slice handling an IMS service.

Several embodiments are comprised herein. Components from one embodiment may be tacitly assumed to be present in another embodiment and it will be obvious to a person skilled in the art how those components may be used in the other exemplary embodiments. In FIG. 11, optional boxes are indicated by dashed lines. The detailed description of some of the following corresponds to the same references provided above, in relation to the actions described for the seventh node 117, 113, 114, and will thus not be repeated here. For example, in some embodiments the seventh node 117, 113, 114 may be configured to be one of the first terminating_ICSCF and the second terminating_ICSCF.

The seventh node 117, 113, 114 is configured to, e.g. by means of a registering unit 1101 within the seventh node 117, 113, 114 configured to, register with the second node 112 as a provider of an IMS service. The second node 112 is configured to manage an NRF in the communications network 10.

The seventh node 117, 113, 114 is also configured to, e.g. by means of a providing unit 1102 within the seventh node 117, 113, 114 configured to, provide the IMS service based on the registration.

In some embodiments, to register may be configured to comprise one of: a) sending the first registration request from the seventh node 117 as a provider of a first IMS service, the first IMS service being configured to be VoLTE, and b) sending the second registration request from the seventh node 117 as a provider of a second IMS service, the second IMS service being configured to be RCS.

The embodiments herein may be implemented through one or more processors, such as a processor 1103 in the seventh node 117, 113, 114 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the seventh node 117, 113, 114. One such carrier may be in the form of a CD ROM disc. It is however feasible with other data carriers such as a memory stick. The computer program code may furthermore be provided as pure program code on a server and downloaded to the seventh node 117, 113, 114.

The seventh node 117, 113, 114 may further comprise a memory 1104 comprising one or more memory units. The memory 1104 is arranged to be used to store obtained information, store data, configurations, schedulings, and applications etc. to perform the methods herein when being executed in the seventh node 117, 113, 114.

In some embodiments, the seventh node 117, 113, 114 may receive information from, e.g., the first node 111, the second node 112, the third node 113, the fourth node 114, the fifth node 115, and/or the sixth node 116 through a receiving port 1105. In some examples, the receiving port 1105 may be, for example, connected to one or more antennas in seventh node 117, 113, 114. In other embodiments, the seventh node 117, 113, 114 may receive information from another structure in the system of communications networks 100 through the receiving port 1105. Since the receiving port 1105 may be in communication with the processor 1103, the receiving port 1105 may then send the received information to the processor 1103. The receiving port 1105 may also be configured to receive other information.

The processor 1103 in the seventh node 117, 113, 114 may be further configured to transmit or send information to e.g., the first node 111, the second node 112, the third node 113, the fourth node 114, the fifth node 115, and/or the sixth node 116, through a sending port 1106, which may be in communication with the processor 1103, and the memory 1104.

Those skilled in the art will also appreciate that the registering unit 1101, and/or the providing unit 1102 described above may refer to a combination of analog and digital circuits, and/or one or more processors configured with software and/or firmware, e.g., stored in memory, that, when executed by the one or more processors such as the processor 1103, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Any of the determining unit 1101 and the registering unit 1101, and/or the providing unit 1102 described above may be the processor 1103 of the seventh node 117, 113, 114, or an application running on such processor.

Thus, the methods according to the embodiments described herein for the seventh node 117, 113, 114 may be respectively implemented by means of a computer program 1107 product, comprising instructions, i.e., software code portions, which, when executed on at least one processor 1103, cause the at least one processor 1103 to carry out the actions described herein, as performed by the seventh node 117, 113, 114. The computer program 1107 product may be stored on a computer-readable storage medium 1108. The computer-readable storage medium 1108, having stored thereon the computer program 1107, may comprise instructions which, when executed on at least one processor 1103, cause the at least one processor 1103 to carry out the actions described herein, as performed by the seventh node 117, 113, 114. In some embodiments, the computer-readable storage medium 1108 may be a non-transitory computer-readable storage medium, such as a CD ROM disc, a memory stick, or stored in the cloud space. In other embodiments, the computer program 1107 product may be stored on a carrier containing the computer program, wherein the carrier is one of an electronic signal, optical signal, radio signal, or the computer-readable storage medium 1108, as described above.

The seventh node 117, 113, 114 may comprise an interface unit to facilitate communications between the seventh node 117, 113, 114 and other nodes or devices, e.g., the first node 111, the second node 112, the third node 113, the fourth node 114, the fifth node 115, and/or the sixth node 116. In some particular examples, the interface may, for example, include a transceiver configured to transmit and receive radio signals over an air interface in accordance with a suitable standard.

In other embodiments, the seventh node 117, 113, 114 may comprise the following arrangement depicted in FIG. 11b. The seventh node 117, 113, 114 may comprise a processing circuitry 1103, e.g., one or more processors such as the processor 1103, in the seventh node 117, 113, 114 and the memory 1104. The seventh node 117, 113, 114 may also comprise a radio circuitry 1109, which may comprise e.g., the receiving port 1105 and the sending port 1106. The processing circuitry 1103 may be configured to, or operable to, perform the method actions according to FIG. 4, in a similar manner as that described in relation to FIG. 11a. The radio circuitry 1109 may be configured to set up and maintain at least a wireless connection with the first node 111, the second node 112, the third node 113, the fourth node 114, the fifth node 115, and/or the sixth node 116. Circuitry may be understood herein as a hardware component.

Hence, embodiments herein also relate to the seventh node 117, 113, 114 operative to handle provision of an IMS service in the communications network 10, the seventh node 117, 113, 114 being operative to operate in the communications network 10. The seventh node 117, 113, 114 is operative to manage a terminating_ICSCF, wherein the communications network 10 is operative to comprise a slice handling an IMS service. The seventh node 117, 113, 114 may comprise the processing circuitry 1103 and the memory 1104, said memory 1104 containing instructions executable by said processing circuitry 1103, whereby the seventh node 117, 113, 114 is further operative to perform the actions described herein in relation to the seventh node 117, 113, 114, e.g., in FIG. 4.

When using the word "comprise" or "comprising", it shall be interpreted as non-limiting, i.e. meaning "consist at least of".

The embodiments herein are not limited to the above described preferred embodiments. Various alternatives, modifications and equivalents may be used.

Therefore, the above embodiments should not be taken as limiting the scope of the invention.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

The invention claimed is:

1. A method performed by a first node operating in a communications network for handling provision of an Internet Protocol Multimedia Subsystem (IMS) service in the communications network, wherein the communications network comprises a first slice handling a first IMS service, and a second slice handling a second IMS service, the method comprising:
    obtaining, from a second node operating in the communications network at least one of:
        a) a first indication of a first routing service instance for a third node comprised in the first slice, the third node handling the first IMS service, and
        b) a second indication of a second routing service instance for a fourth node comprised in the second slice, the fourth node handling the second IMS service, and
    routing a request, received from a fifth node operating in another communications network, to one of the third node and the fourth node, wherein one of:
        i) with the proviso that the received request is for the first IMS service, the routing is based on the obtained first indication, and
        ii) with the proviso that the received request is for the second IMS service, the routing is based on the obtained second indication
    wherein the first node manages an Interconnection Border Control Function (IBCF), the second node manages a Network Repository Function (NRF), the third node is a first terminating Interrogating-Call Session Control Function (I-CSCF), and the fourth node is a second terminating I-CSCF.

2. The method according to claim 1, wherein at least one of:
    a. the first IMS service is Voice Over Long Term Evolution, VOLTE, and
    b. the second IMS service is Rich Communication Services, RCS.

3. The method according to claim 1, the method further comprising:
    sending a query or a discovery request to the second node, for at least one of the first indication and the second indication, and wherein the obtaining is in response to the sent query.

4. The method according to claim 3, wherein one of:
    a. with the proviso that the sent query comprises an identifier for one of the first IMS service and the second IMS service, only the one of the first indication and the second indication corresponding to the IMS service identified by the sent identifier is obtained, and
    b. with the proviso that the sent query lacks an identifier for one of the first IMS service and the second IMS service, both of the first indication and the second indication are obtained.

5. The method according to claim 3, wherein the sending is over one of:
   a. an SBI N70 interface, and
   b. a Cx/Diameter protocol operation.

6. The method according to claim 1, wherein the first indication is a first routing service instance address and the second indication is a second routing service instance address.

7. The method according to claim 1, wherein the first node manages a terminating_I-CSCF, and wherein the second node manages an IMS-Home Subscriber Server, IMS-HSS.

8. The method according to claim 1, the method further comprising:
   storing the obtained at least one of the first indication and the second indication, and wherein the routing is based on the stored first indication and the second indication.

9. A method performed by a second node operating in a communications network for handling provision of an Internet Protocol Multimedia Subsystem (IMS) service in the communications network, wherein the communications network comprises a first slice handling a first IMS service, and a second slice handling a second IMS service, the method comprising:
   providing, to a first node operating in the communications network, at least one of:
      i) a first indication of a first routing service instance for a third node comprised in the first slice, the third node handling the first IMS service, wherein the first indication enables routing by the first node of a first request received at the first node, said first request received from a fifth node operating in another communications network, for the first IMS service to the third node, and
      ii) a second indication for a second routing service instance for a fourth node comprised in the second slice, the fourth node handling the second IMS service, wherein the second indication enables routing by the first node of a second request recieved at the first node, said second request received from the fifth node operating in the other communications network, for the second IMS service to the fourth node
   wherein the first node manages an Interconnection Border Control Function (IBCF), the second node manages a Network Repository Function (NRF), the third node is a first terminating Interrogating-Call Session Control Function (I-CSCF), and the fourth node is a second terminating I-CSCF.

10. The method according to claim 9, wherein at least one of:
    a. the first IMS service is Voice Over Long Term Evolution, VOLTE, and
    b. the second IMS service is Rich Communication Services, RCS.

11. The method according to claim 9, the method further comprising:
    receiving a query or a discovery request from the first node, for at least one of the first indication and the second indication, and wherein the providing is in response to the received query.

12. The method according to claim 11, the method further comprising:
    registering with a sixth node operating in the communications network, and
    wherein the query is for a location of at least one of the third node and the fourth node, and wherein the query is received based on the registration.

13. The method according to claim 12, wherein one of:
    a. with the proviso that the received query comprises an identifier for one of the first IMS service and the second IMS service, only the one of the first indication and the second indication corresponding to the IMS service identified by the received identifier is provided, and
    b. with the proviso that the received query lacks an identifier for one of the first IMS service and the second IMS service, both of the first indication and the second indication are provided.

14. The method according to claim 9, the method further comprising:
    obtaining at least one of:
    a. a first registration request from the third node as a provider of the first IMS service, wherein the provided first indication is based on the first registration request, and
    b. a second registration request from the fourth node as a provider of the second IMS service, wherein the provided second indication is based on the second registration request.

15. The method according to claim 14, the method further comprising:
    determining at least one of the first indication and the second indication, based, respectively, on the obtained first registration request and the obtained second registration request.

* * * * *